*(12)* United States Patent
Shimizu et al.

(10) Patent No.: US 8,385,628 B2
(45) Date of Patent: Feb. 26, 2013

(54) IMAGE ENCODING AND DECODING METHOD, APPARATUSES THEREFOR, PROGRAMS THEREFOR, AND STORAGE MEDIA FOR STORING THE PROGRAMS

(75) Inventors: Shinya Shimizu, Yokosuka (JP); Masaki Kitahara, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 990 days.

(21) Appl. No.: 12/441,234

(22) PCT Filed: Sep. 18, 2007

(86) PCT No.: PCT/JP2007/068041
§ 371 (c)(1),
(2), (4) Date: Mar. 13, 2009

(87) PCT Pub. No.: WO2008/035654
PCT Pub. Date: Mar. 27, 2008

(65) Prior Publication Data
US 2010/0086222 A1    Apr. 8, 2010

(30) Foreign Application Priority Data

Sep. 20, 2006  (JP) ................................ 2006-254023

(51) Int. Cl.
*G06K 9/00* (2006.01)
(52) U.S. Cl. ...................................................... 382/154
(58) Field of Classification Search .................. 382/154, 382/232–253, 285; 345/178; 348/14.16, 348/333.09
See application file for complete search history.

(56) References Cited

U.S. PATENT DOCUMENTS 6,049,619 A * 4/2000 Anandan et al. ............. 382/107
6,266,158 B1 7/2001 Hata et al.
(Continued)

FOREIGN PATENT DOCUMENTS

CN  1910931 A  2/2005
CN  1864406 A  11/2006
(Continued)

OTHER PUBLICATIONS

ITU-T Rec.H.264/ISO/IEC 11496-10, "Editor's Proposed Draft Text Modifications for Joint Video Specification (ITU-T Rec. H.264/ISO/IEC 14496-10 AVC), Draft 7", Final Committee Draft, Document JVT-E022, pp. 10-13, and 62-68, Sep. 2002.

(Continued)

*Primary Examiner* — Brian Le
(74) *Attorney, Agent, or Firm* — Harness, Dickey & Pierce, P.L.C.

(57) ABSTRACT

An image encoding method includes determining and encoding global parallax data which is probably correct parallax data in consideration of the Epipolar geometry constraint between a camera of a standard viewpoint, which is selected from the entire multi-viewpoint images, and images obtained by all the other viewpoints; generating base parallax data for each camera as a viewpoint other than the standard viewpoint, where the base parallax data is probably correct parallax data in consideration of the Epipolar geometry constraint between the image of the relevant camera and the images of all the other cameras based on the global parallax data and the camera parameters; determining and encoding correction parallax data used for correcting the base parallax data, so as to indicate parallax data between the image of the relevant camera and an already-encoded reference viewpoint image used for parallax compensation; and encoding the image of the relevant camera by using parallax data obtained by correcting the base parallax data by means of the correction parallax data.

29 Claims, 21 Drawing Sheets

U.S. PATENT DOCUMENTS

| | | |
|---|---|---|
| 6,430,224 B1 | 8/2002 | Naito et al. |
| 2005/0031035 A1 | 2/2005 | Vedula et al. |
| 2006/0029256 A1* | 2/2006 | Miyoshi et al. ............... 382/104 |
| 2007/0071107 A1 | 3/2007 | Ha |
| 2007/0189396 A1 | 8/2007 | Kitahara et al. |

FOREIGN PATENT DOCUMENTS

| | | |
|---|---|---|
| EP | 1661384 A2 | 5/2006 |
| JP | 9-261653 A | 10/1997 |
| JP | 9-275578 A | 10/1997 |
| JP | 10-271511 A | 10/1998 |
| JP | 2003-009179 A | 1/2003 |
| JP | 2007-502053 A | 2/2007 |
| KR | 2006-55534 A | 5/2006 |
| RU | 2 168 192 C2 | 5/2001 |
| RU | 2 209 527 C2 | 7/2003 |
| WO | WO-2005/018217 A2 | 2/2005 |
| WO | WO-2006/073116 A1 | 7/2006 |
| WO | 2006/080739 A1 | 8/2006 |
| WO | 2007/037645 A1 | 4/2007 |
| WO | WO-2007/077942 A1 | 7/2007 |
| WO | WO-2007/077989 A1 | 7/2007 |

OTHER PUBLICATIONS

Hideaki Kimata and Masaki Kitahara, "Preliminary results on multiple view video coding (3DAV)", document M10976 MPEG Redmond Meeting, Jul. 2004.

Shinya Shimizu, Masaki Kitahara, Kazuto Kamikura and Yoshiyuki Yashima, "Multi-view Video Coding based on 3-D Warping with Depth Map", In Proceedings of Picture Coding Symposium 2006, SS3-6, Apr. 2006.

Konushin, Anton, "Geometrical properties of multiple images," Computer graphics and multimedia, Issue No. 3, Jul. 31, 2006.

Ho, Yo-Sung, et al., "Global Disparity Compensation for Multi-view Video Coding," Joint Video Team (JVT) of ISO/IEC MPEG & ITU-T VCEG, doc. JVT-T136, 20th Meeting: Klagenfurt, Austria, Jul. 15-21, 2006.

Hata, Koichi, et al., "Epipolar Geometry Estimation and Its Application to Image Coding," Proceedings of 1999 International Conference on Image Processing, Kobe, Japan, Oct. 24-28, 1999, pp. 472-476.

* cited by examiner

IMAGE ENCODING AND DECODING METHOD, APPARATUSES THEREFOR, PROGRAMS THEREFOR, AND STORAGE MEDIA FOR STORING THE PROGRAMS

TECHNICAL FIELD

The present invention relates to encoding and decoding techniques of multi-viewpoint images and multi-viewpoint video images.

Priority is claimed on Japanese Patent Application No. 2006-254023, filed Sep. 20, 2006, the contents of which are incorporated herein by reference.

BACKGROUND ART

Multi-viewpoint images are images obtained by photographing the same object and background thereof by using a plurality of cameras, and multi-viewpoint video images are video images of the multi-viewpoint images. Below, a video image obtained by a single camera is called a "two-dimensional video image", and a set of multiple two-dimensional video images obtained by photographing the same object and background thereof is called a "multi-viewpoint video image".

As there is a strong correlation between two-dimensional video images, the encoding efficiency thereof is improved by using such a correlation. On the other hand, when the cameras for obtaining multi-viewpoint images or multi-viewpoint video images are synchronized with each other, the images (of the cameras) corresponding to the same time have captured the object and background thereof in entirely the same state from different positions, so that there is a strong correlation between the cameras. The encoding efficiency of the multi-viewpoint images or the multi-viewpoint video images can be improved using this correlation.

First, conventional techniques relating to the encoding of two-dimensional video images will be shown.

In many known methods of encoding two-dimensional video images, such as H. 264, MPEG-2, MPEG-4 (which are international encoding standards), and the like, highly efficient encoding is performed by means of motion compensation, orthogonal transformation, quantization, entropy encoding, or the like. A technique called "motion compensation" is a method which uses a temporal correlation between frames.

Non-Patent Document 1 discloses detailed techniques of motion compensation used in H. 264. General explanations thereof follow.

In accordance with the motion compensation in H.264, a target frame for encoding is divided into blocks of any size. For each block, an already-encoded block called a "reference frame" is selected, and an image is predicted using vector data (called "motion vector") which indicates a corresponding point. The relevant block division has 7 possible forms such as 16×16 (pixels), 16×8, 8×16, 8×8, 8×4, 4×8, and 4×4, so that image prediction can be performed in consideration of a distinctive feature in the position and size of the imaged object by using a fine unit. Therefore, a residual of an encoding target, which is indicated by the difference between a predicted image and the original image, is reduced, thereby implementing a high level of encoding efficiency.

Next, a conventional encoding method of multi-viewpoint images or multi-viewpoint video images will be explained.

The difference between the encoding of multi-viewpoint images and the encoding of multi-viewpoint video images is that multi-viewpoint video images have, not only a correlation between cameras, but also a temporal correlation. However, the same method using the correlation between cameras can be applied to both the multi-viewpoint images and the multi-viewpoint video images. Therefore, methods used in the encoding of multi-viewpoint video images will be explained below.

As the encoding of multi-viewpoint video images uses a correlation between cameras, the multi-viewpoint video images are highly efficiently encoded in a known method which uses "parallax (or disparity) compensation" in which motion compensation is applied to images obtained by different cameras at the same time. Here, "parallax" (or disparity) is the difference between positions, to which the same point on an imaged object is projected, on the image planes of cameras which are disposed at different positions.

FIG. 21 is a schematic view showing the concept of parallax generated between such cameras. In the schematic view of FIG. 21, image planes of cameras, whose optical axes are parallel to each other, are looked down (vertically) from the upper side thereof. Generally, such points, to which the same point on an imaged object is projected, on image planes of different cameras, are called "corresponding points".

In parallax compensation, based on the above corresponding relationship, each pixel value of a target frame for encoding is predicted using a reference frame, and the relevant prediction residual and parallax data which indicates the corresponding relationship are encoded.

In many methods, parallax is represented by a vector on an image plane. For example, Non-Patent Document 2 discloses a method of performing parallax compensation for each block, where parallax for each block is represented by a two-dimensional vector, that is, two parameters (x and y components). In this method, parallax data having two parameters and a prediction residual are encoded.

In Non-Patent Document 3, camera parameters are used for encoding, and the parallax vector is represented by one-dimensional data based on the Epipolar geometry constraint, thereby efficiently encoding predicted data. FIG. 22 is a schematic view showing the concept of the Epipolar geometry constraint.

In accordance with the Epipolar geometry constraint, for two cameras (camera A and camera B), a point on one of the images, which corresponds to another point in the other image is constrained on a straight line called an "Epipolar line". In the method disclosed in Non-Patent Document 3, in order to indicate the position on the Epipolar line, parallax to all target frames for encoding is represented by one parameter such as the distance from the camera, by which the reference frame is obtained, to the imaged object.

Non-Patent Document 1: ITU-T Rec.H.264/ISO/IEC 11496-10, "Editor's Proposed Draft Text Modifications for Joint Video Specification (ITU-T Rec. H.264/ISO/IEC 14496-10 AVC), Draft 7", Final Committee Draft, Document JVT-E022, pp. 10-13, and 62-68, September 2002.

Non-Patent Document 2: Hideaki Kimata and Masaki Kitahara, "Preliminary results on multiple view video coding (3DAV)", document M10976MPEG Redmond Meeting, July, 2004.

Non-Patent Document 3: Shinya SHIMIZU, Masaki KITAHARA, Kazuto KAMIKURA and Yoshiyuki YASHIMA, "Multi-view Video Coding based on 3-D Warping with Depth Map", In Proceedings of Picture Coding Symposium 2006, SS3-6, April, 2006.

DISCLOSURE OF INVENTION

Problem to be Solved by the Invention

In conventional encoding methods for multi-viewpoint video images, when the camera parameters are known, parallax compensation to all target frames for encoding can be implemented by means of the Epipolar geometry constraint, that is, only by encoding one-dimensional data such as the distance from the camera to the imaged object for the reference frame, regardless of the number of the cameras. Accordingly, it is possible to efficiently encode the parallax data.

However, as it is difficult to accurately measure the camera parameters, they have some errors. Accordingly, when the parallax data based on the Epipolar geometry constraint for the reference frame is computed so as to most efficiently perform the parallax compensation of all target frames (for encoding) obtained at the same time, the computed parallax data includes errors in the camera parameters of all cameras.

Therefore, the prediction error for parallax compensation, which is produced when one target frame is selected, is affected by an error for another camera, and thus is degraded in comparison with the prediction error produced when using parallax data which is obtained for the set of the relevant target frame and the reference frame.

In light of the above circumstances, an object of the present invention relating to the encoding of multi-viewpoint video images is to implement accurate parallax compensation by using less parallax data even when there is an encoding distortion of the reference frame or a measurement error of the camera parameters, thereby providing a higher encoding efficiency than that obtained by conventional methods.

Means for Solving the Problem

A first mode of the image encoding method in accordance with the present invention has (i) a step of determining and encoding global parallax data which is probably correct parallax data in consideration of the Epipolar geometry constraint between a camera of a standard viewpoint, which is selected from the entire multi-viewpoint images, and images obtained by all the other viewpoints; (ii) a step of generating base parallax data for each camera as a viewpoint other than the standard viewpoint, where the base parallax data is probably correct parallax data in consideration of the Epipolar geometry constraint between the image of the relevant camera and the images of all the other cameras based on the global parallax data and the camera parameters; (iii) a step of determining and encoding correction parallax data used for correcting the base parallax data, so as to indicate parallax data between the image of the relevant camera and an already-encoded reference viewpoint image used for parallax compensation; and (iv) encoding the image of the relevant camera by using parallax data obtained by correcting the base parallax data by means of the correction parallax data.

Accordingly, the correction parallax data is assigned to the target image for encoding, only in consideration of an image (i.e., the reference viewpoint image) referred to in the parallax compensation. Therefore, influence on the global parallax data by errors in all camera parameters or by an encoding distortion of a reference frame can be removed for each camera, thereby implementing a high level of efficiency.

In addition, as the global parallax data indicates general parallax data as commonly applicable data, the amount of correction applied to the base parallax data is small, and thus the amount of code required for the correction parallax data is small.

That is, in comparison with the case of determining and encoding parallax data for each target image for encoding, the amount of code required for a common part can be reduced, thereby reducing the total amount of code.

A second mode of the image encoding method in accordance with the present invention has (i) a step of determining and encoding global parallax data which is probably correct parallax data in consideration of the Epipolar geometry constraint between a camera of a standard viewpoint, which is selected from the entire multi-viewpoint images, and images obtained by all the other viewpoints; (ii) a step of generating base parallax data for each camera as a viewpoint other than the standard viewpoint, where the base parallax data is probably correct parallax data in consideration of the Epipolar geometry constraint between the image of the relevant camera and the images of all the other cameras based on the global parallax data and the camera parameters; (iii) a step of determining and encoding a correction parallax vector used for correcting a corresponding point provided using the base parallax data, so as to indicate, for the image of the relevant camera, an optimum corresponding point (for parallax compensation) on an already-encoded reference viewpoint image used for the parallax compensation; and (iv) encoding the image of the relevant camera while executing the parallax compensation by correcting the corresponding point (provided using the base parallax data) by means of the correction parallax vector.

Accordingly, the correction parallax vector is assigned to the target image for encoding, only in consideration of an image (i.e., the reference viewpoint image) referred to in the parallax compensation. Therefore, influence on the global parallax data by errors in all camera parameters or by an encoding distortion of a reference frame can be removed for each camera, thereby implementing a high level of efficiency.

In addition, as the global parallax data indicates general parallax data as commonly applicable data, the amount of correction applied to a corresponding relationship defined by the base parallax data is small, and thus the amount of code required for the correction parallax data is small.

That is, in comparison with the case of determining and encoding parallax data for each target image for encoding, the amount of code required for a common part can be reduced, thereby reducing the total amount of code.

In the first mode, in order to further correct corresponding point data (i.e., a corresponding point vector) which is indicated by parallax data obtained using the base parallax data and the correction parallax data, a step of determining and encoding a two-dimensional correction vector is further provided.

Accordingly, it is possible to correct a minute disagreement between corresponding points, which is caused by an error in camera parameters or a lens distortion of a camera used for obtaining the target image for encoding, and cannot be represented based on the Epipolar geometry constraint. Therefore, the prediction efficiency of parallax compensation can be improved, thereby implementing a high level of efficiency.

In contrast to a conventional method of performing the relevant correction using only a two-dimensional vector, an error caused by the geometry constraint is removed using the correction parallax data. Therefore, a vector used for the correction has a very small size, and highly accurate prediction can be performed using a smaller amount of code.

For each of the above-described modes, a step of setting an area division on the image of the camera of the standard viewpoint, and a step of encoding data which indicates the area division may be provided, where the global parallax data may be determined and encoded for each divided area.

Accordingly, parallax data, which varies in accordance with the object captured in the image, can be accurately indicated, thereby improving the accuracy of the global parallax data. Therefore, it is possible to reduce the amount of code required for the data used for correcting the base parallax data, and thus to implement a high level of efficiency.

If the entire image of the standard viewpoint has been subjected to an area division and each divided area has been processed and encoded, then the area division set for encoding the image of the standard viewpoint may coincide with the area division which indicates a unit used for determining the global parallax data, so that the data, which indicates the area division set on the image of the camera of the standard viewpoint, is not repeatedly encoded.

In addition, as the video image itself and the parallax data do not have completely corresponding characteristics, areas having the same characteristics for the video image may not coincide with corresponding areas having the same characteristics for the parallax data. In such a case, it may be preferable to slightly change the area division for determining the global parallax data so that it does not completely coincide with the area division set for encoding the image of the standard viewpoint.

In this case, only the difference between the area divisions may be encoded so as to reduce the relevant amount of code.

In addition, a step of setting an area division on the image of a camera as a target viewpoint for encoding, and a step of encoding data which indicates the area division may be provided, where the correction parallax data, the correction parallax vector, or the correction vector may be determined and encoded for each divided area.

Accordingly, data of a corresponding point, which is used in the parallax compensation and varies in accordance with the object captured in the image, can be accurately indicated, thereby improving the image prediction accuracy when the parallax compensation is performed. Therefore, it is possible to implement a high level of efficiency.

If the entire image of the target viewpoint is subjected to an area division and each divided area is processed and encoded, then the area division for encoding the relevant image may coincide with an area division which indicates a unit used for determining parallax data, so that it is possible to omit encoding the data which indicates the unit for determining parallax data.

In addition, as the video image itself and the parallax data do not have completely corresponding characteristics, areas having the same characteristics for the video image may not coincide with corresponding areas having the same characteristics for the parallax data. In such a case, it may be preferable that the area division set for encoding the image does not completely coincide with the area division which indicates the unit for setting the parallax data, so that they slightly differ from each other. In this case, only the difference between the area divisions may be encoded so as to reduce the relevant amount of code.

For each oh the above-described modes, a step of selecting the camera referred to in the parallax compensation, and a step of encoding an index which indicates the selected camera may be provided, where the correction parallax data, the correction parallax vector, or the correction vector, which is determined for each target image for encoding, may be set to a value most suitable for the parallax compensation, by using an already-encoded image of the camera indicated by the above index.

Accordingly, an image of not only the camera of the standard viewpoint, but also a camera close to the camera used for obtaining the target image for encoding, can be the reference image. Therefore, an area where no corresponding point can be defined due to an occlusion or the like is small, thereby implementing accurate prediction. That is, it is possible to reduce a residual (to be encoded) of parallax compensation, and thus to implement efficient encoding.

In addition, the global parallax data and the base parallax data of the present invention do not depend on a reference object which is referred to. Therefore, the amount of code required for encoding the correction parallax data or the correction vector can be reduced for any reference object.

If an area division is set when determining parallax data for the target image for encoding, then a reference target most suitable for each divided area may be selected so as to perform more accurate prediction and implement efficient encoding.

For each of the above-described modes, (i) a step of determining local parallax data based on the Epipolar geometry constraint before determining the global parallax data, where the local parallax data is parallax data for each camera, and (ii) a step of generating candidates of the global parallax data, by using the local parallax data determined for each camera and based on the Epipolar geometry constraint, may be provided, where in the step of determining the global parallax data, an average of the global parallax data candidates obtained for a single area may be determined as the global parallax data assigned to the area.

Accordingly, the local parallax data, which should be parallax data most suitable for each camera in parallax compensation, is first computed, and the global parallax data is generated using the local parallax data.

Therefore, it is possible to determine the global parallax data for minimizing parallax data which should be corrected in a process performed later. That is, no useless data is encoded, thereby implementing efficient encoding.

When determining the global parallax data from the global parallax data candidates, a global parallax data candidate which appears most frequently in the target area may be selected (instead of computing an average) so as to reduce the parallax data which should be corrected in a process performed later.

Additionally, a step of determining difference parallax data in accordance with the difference between the local parallax data and the base parallax data may be provided, where in the step of setting an area division on the image of the camera of the target viewpoint for encoding, a maximum area division by which the difference parallax data is almost constant in each divided area may be set, and in the step of determining the correction parallax data, the correction parallax data may be determined using the difference parallax data in the relevant area.

Accordingly, the global parallax data and the correction parallax data can be computed by a single operation. Therefore, in comparison with the case of individually computing them (which requires a large amount of computation), the amount of computation can be reduced.

In addition, if a type of area division is limited, a dispersion of the difference parallax data may be computed for each divided area, and an area division may be selected based on the value of the dispersion, so as to perform a high-speed computation for setting the area division.

For each of the above-described modes, in the step of determining the base parallax data or the step of determining the global parallax data, continuity on an image before a conversion, to which parallax data is provided, can be used for determining continuous parallax data on an image after the conversion.

For example, in a case of determining parallax data for pixels which are not adjacent to each other but were adjacent to each other before a conversion, parallax data assigned to a pixel between the above two pixels may be generated by means of interpolation using parallax data (determined after the conversion) of the two pixels.

In such a case, the number of areas to which the base parallax data and the global parallax candidates are provided increases, and data which should be corrected can be reduced. Therefore, it is possible to reduce the relevant amount of code and thus to implement a high level of efficiency.

In addition, the continuity can be very accurately judged by using, not only an adjacency relationship, but also parallax data which indicates three-dimensional data.

Therefore, it is possible to prevent an increase in the data which should be corrected, where such an increase may be caused by generating erroneous base parallax data or global parallax data candidates.

In the above-described image (including video image) encoding and corresponding image decoding of the present invention, various types of parallax data, data for correcting the parallax data, or area division data may be encoded in consideration of a spatial or temporal variation.

As the various types of parallax data, the data for correcting the parallax data, or the area division data depends on a captured image, correlation in the image or temporal correlation is very high.

Therefore, by using such characteristics, the encoding can be performed by removing redundancy for the various types of parallax data, the data for correcting the parallax data, or the area division data. Therefore, the relevant amount of code can be reduced and a high level of efficiency can be implemented.

In addition, a step of reducing an already-encoded image of the standard viewpoint may be provided, where when the global parallax data is determined, the distance from the camera as the standard viewpoint to the imaged object may be computed for the generated reduced image.

In such a case, fine data for the relevant image can be removed due to the reduction of the image. Therefore, it is possible to remove an error or a small variation in parallax data, which may be caused by errors in the camera parameters. In accordance with the global parallax data having such characteristics, a general corresponding relationship between the cameras, which is not affected by, for example, errors in the camera parameters, can be obtained.

Therefore, it is possible to reduce parallax data, which should be duplicately corrected using the correction parallax data or the correction vector, which is encoded for each camera, thereby improving the entire encoding efficiency. In addition, using the reduced image decreases the number of pixels to which a computation for determining the relevant parallax data is applied, thereby also reducing the amount of computation.

When encoding (or decoding) multi-viewpoint video images, a set of frames belonging to the same time may be regarded as multi-viewpoint images, to which the image encoding (or decoding) method of the present invention can be applied.

Additionally, for multi-viewpoint video images, the entire image may be encoded, not by using the method of the present invention, but by selecting, for example, another method such as motion compensation which uses temporal correlation, for each target for encoding, thereby improving the encoding efficiency.

Effect of the Invention

In accordance with the present invention, highly efficient encoding of the whole multi-viewpoint images or multi-viewpoint video images can be performed by implementing parallax compensation having a high prediction accuracy in consideration of an influence of estimation errors of camera parameters, while preventing a great increase in the amount of data used for the parallax compensation.

Figure 1:
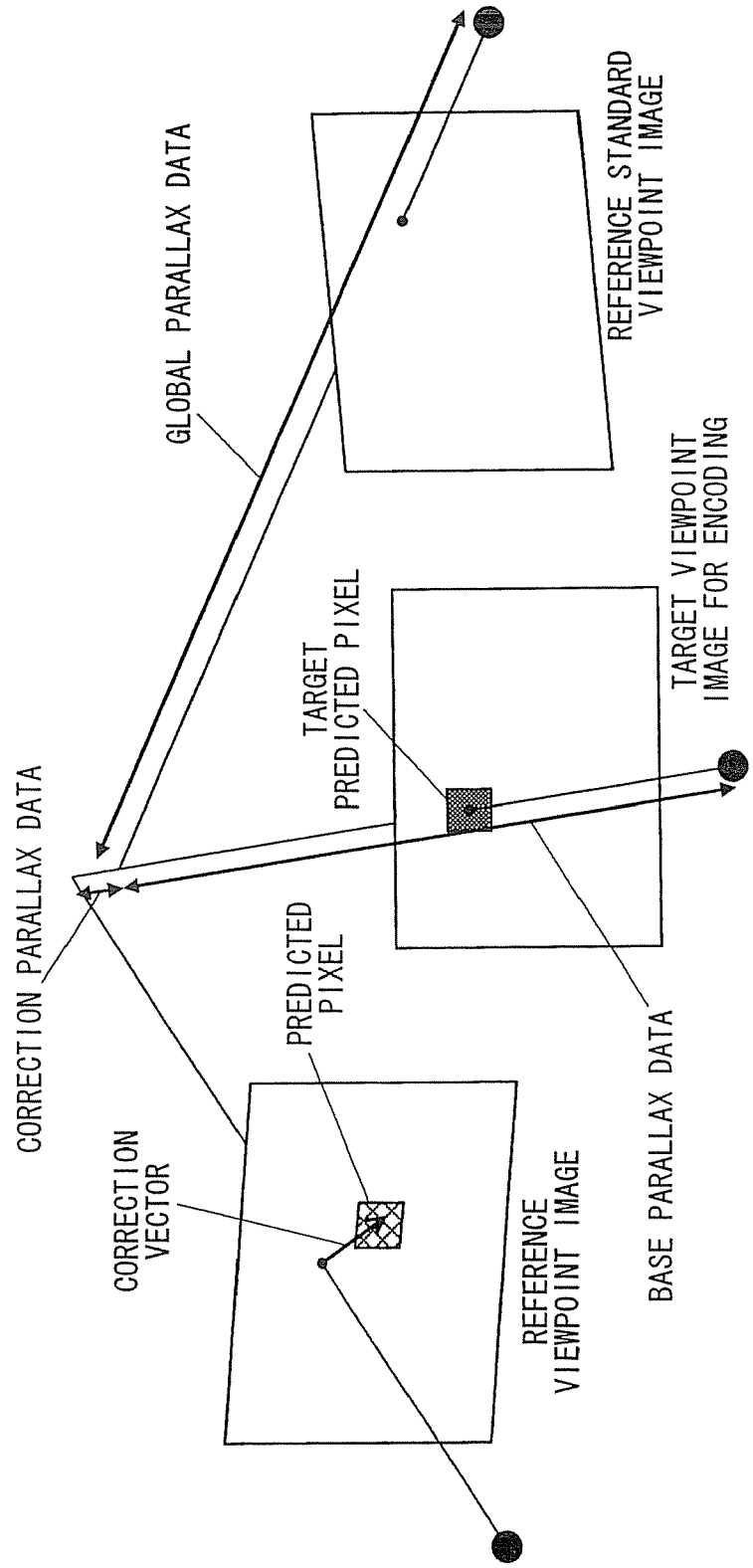
FIG. 1 is a schematic diagram showing each data item which is defined in the present invention and is used for parallax compensation.

REFERENCE SYMBOLS 100, 200 image encoding apparatus
101, 201 image input unit
102, 202 image memory
103, 203 standard viewpoint image input unit
104, 204 standard viewpoint image memory
105, 206 global parallax compensation data determination unit
106, 207 base parallax data determination unit
107, 208 parallax compensation data determination unit
108, 209 image encoding unit
109, 210 decoded image memory
205 local parallax compensation data determination unit
1051 standard viewpoint image block division setting unit
1052 block division data encoding unit
1053 global parallax data estimation unit
1054 global parallax data encoding unit
1071, 2081 target image block division setting unit 1072, 2082 block division data encoding unit
1073, 2085 reference viewpoint index setting unit
1074, 2086 viewpoint index encoding unit
1075, 2083 correction parallax data determination unit
1076, 2084 correction parallax data encoding unit
1077, 2087 correction vector determination unit
1078, 2088 correction vector encoding unit
1079, 2089 parallax compensation efficiency estimation unit
2051 local parallax data block division setting unit
2052 reference viewpoint index setting unit
2053 local parallax data determination unit
2054 parallax compensation efficiency estimation unit
2061 standard viewpoint image block division setting unit
2062 block division data encoding unit
2063 global parallax data estimation unit
2064 global parallax data encoding unit
300 video decoding apparatus
301 encoded data input unit
302 standard viewpoint image input unit
303 image memory
304 global parallax compensation data decoding unit
305 base parallax data determination unit
306 parallax compensation data decoding unit
307 parallax-compensated image generating unit
308 image decoding unit

BEST MODE FOR CARRYING OUT THE INVENTION

One of the most distinctive features of the present invention in comparison with known techniques is to set a standard viewpoint; compute global parallax data based on the Epipolar geometry constraint for an already-encoded image on the standard viewpoint, so as to subject all the other target images (for encoding) obtained at the same time to parallax compensation; convert the global parallax data to base parallax data based on the Epipolar geometry constraint for each target image; and encode parallax data, which is used for correcting the base parallax data, for each target image in accordance with the feature of the target image and errors in the camera parameters.

The parallax data based on the Epipolar geometry constraint can be represented by the distance from the viewpoint of the relevant image to the imaged object, the distance measured from a reference point on the Epipolar straight line, and index values corresponding to such distances.

Below, the "parallax data" indicates the above parallax data based on the Epipolar geometry constraint. The concepts of the global parallax data and the base parallax data used in the present invention will be explained.

Global Parallax Data

The global parallax data is parallax data provided to an image of the standard viewpoint. In the following explanation, the parallax data is provided to each area.

If an area A has parallax data "d", corresponding areas $R_A(d, i)$ in images obtained at other viewpoints (i=1, 2, 3, ..., N) at the same time are computed based on the Epipolar geometry constraint. In such a case, the degree of difference in images of the corresponding areas can be estimated by using, for example, the sum of absolute values of differences, the sum of square values of differences, a dispersion of the differences, or the sum of weighed values relating to a plurality of standards.

For all combinations of $\{A, R_A(d, i)\ i=1, 2, \ldots, N\}$, when the sum of the above degrees of difference is called the estimated value of parallax data "d" of area A, the parallax data which provides the smallest estimated value is called "global parallax data D".

In addition, in order to reduce the influence of the error, the estimated value may be computed after a correction term is added to the parallax data "d" with an assumption of continuity of an object in the actual space.

When using the Epipolar geometry constraint so as to compute the above corresponding areas, errors occur in the relevant computation and the camera parameters. Therefore, for a specific viewpoint i=k, the parallax data "d" for minimizing the amount of code (Rate (A, d, k)) may not coincide with the global parallax data D.

Therefore, the global parallax data D is parallax data which produces the highest similarity between a target area and the corresponding areas (to the target area) of all the other viewpoints. Conceptually, the global parallax data D indicates a distance with a low level of accuracy, such as the approximate distance from the camera to the imaged object for the target area.

Base Parallax Data

The base parallax data indicates the same target as the global parallax data. However, they are different from each other for only one point such that the global parallax data has the standard viewpoint as a standard, while the base parallax data has another viewpoint as a standard.

The global parallax data and the base parallax data in a corresponding area are each data indicating the same three-dimensional position. However, generally, the parallax data is represented by a distance from a camera to the imaged object. Therefore, the concrete value of parallax data varies when the viewpoint changes.

FIG. 1 is a schematic diagram showing each data item which is defined in the present invention and is used for parallax compensation.

In the image encoding method of the present invention, encoding is performed by selecting a standard viewpoint from target multi-viewpoint images for encoding. Encoding of the images having viewpoints other than the standard viewpoint is performed by means of image prediction using an already-encoded image having another viewpoint.

This already-encoded image of another viewpoint, which is used for image prediction, is called a "reference viewpoint image". The reference viewpoint image may be the same as the image of the standard viewpoint, or may differ therefrom. In order to show a general case, the standard viewpoint image has another viewpoint in FIG. 1, First, the above-described global parallax data is provided to the standard viewpoint image. The three-dimensional position of the imaged object, which is provided by the global parallax data, corresponds to the base parallax data if viewing from a target viewpoint for encoding. Between each pixel on the target image for encoding and the reference viewpoint image, parallax data (called "local parallax data") for providing highest similarity between corresponding pixels is computed, where the difference between the local parallax data and the base parallax data is called "correction parallax data".

Figure 22:
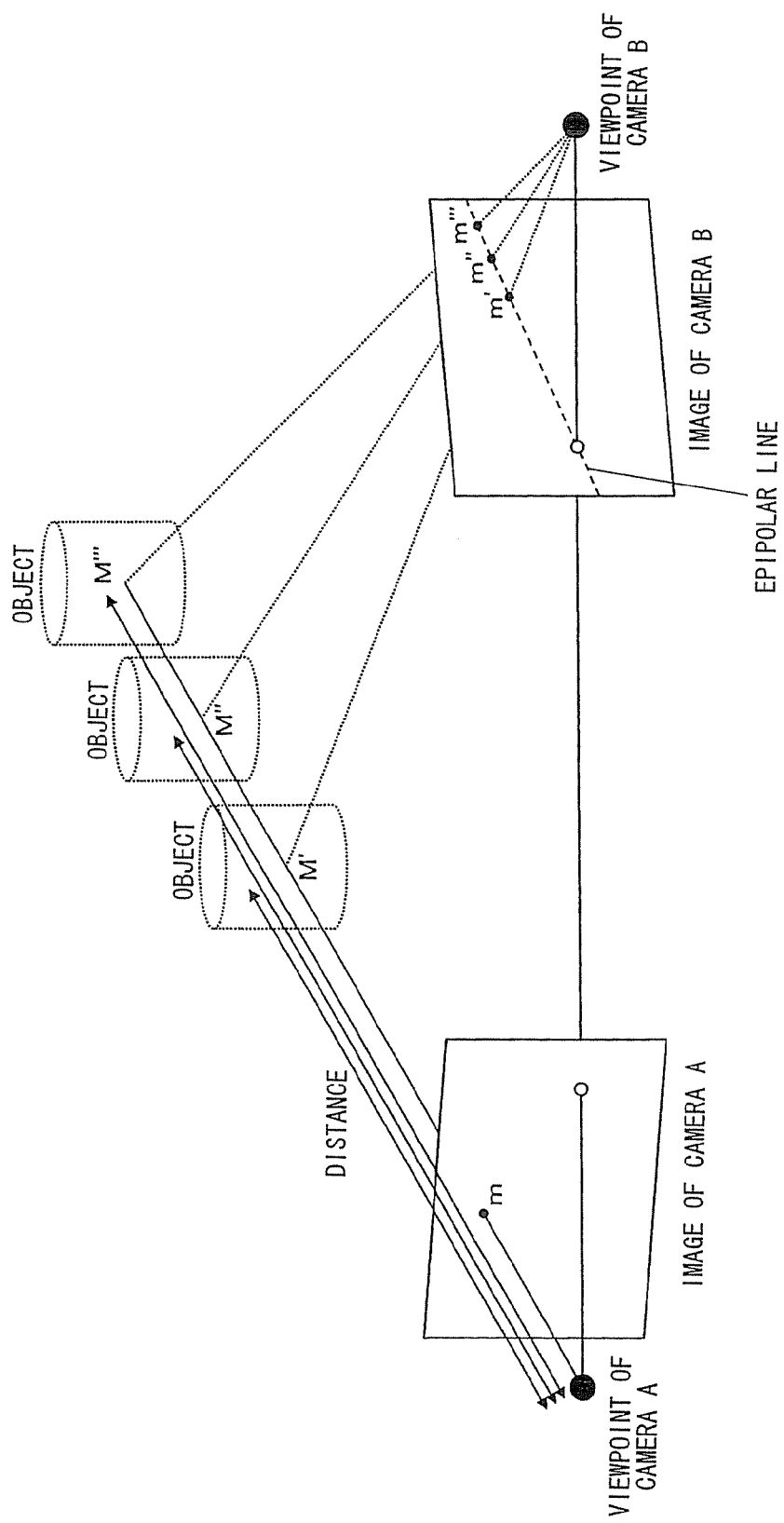
FIG. 22 is a schematic view showing the concept of the Epipolar geometry constraint.

The parallax data to each pixel on the target image for encoding is constrained by the Epipolar geometry constraint. Therefore, as shown in FIG. 22, for any parallax data provided, the corresponding area on the reference viewpoint image is constrained on a straight line on this image. In such a case, if the camera parameters have an error, no true corresponding point is present on the straight line.

Accordingly, the vector from the corresponding point provided by the local parallax data to the true corresponding point is called a "correction vector".

The image of a pixel on the target image for encoding is predicted by using, not only the global parallax data (and the base parallax data converted therefrom), but also image data of a corresponding point on the reference viewpoint image, which is computed by providing the correction parallax data and the correction vector.

Although it is not shown in FIG. 1, the global parallax data is encoded for one of multi-viewpoint images (a set of images having the same display time in multi-viewpoint video images), and the correction parallax data and the correction vector are encoded for each image of each viewpoint except for the standard viewpoint. In addition, the base parallax data is computed using the global parallax data, and thus is not encoded.

Below, the present invention will be explained in detail in accordance with embodiments. In the following embodiments, it is assumed that multi-viewpoint video images obtained by three cameras are encoded, and images of cameras B and C are encoded for the standard viewpoint of camera A.

Figure 2:
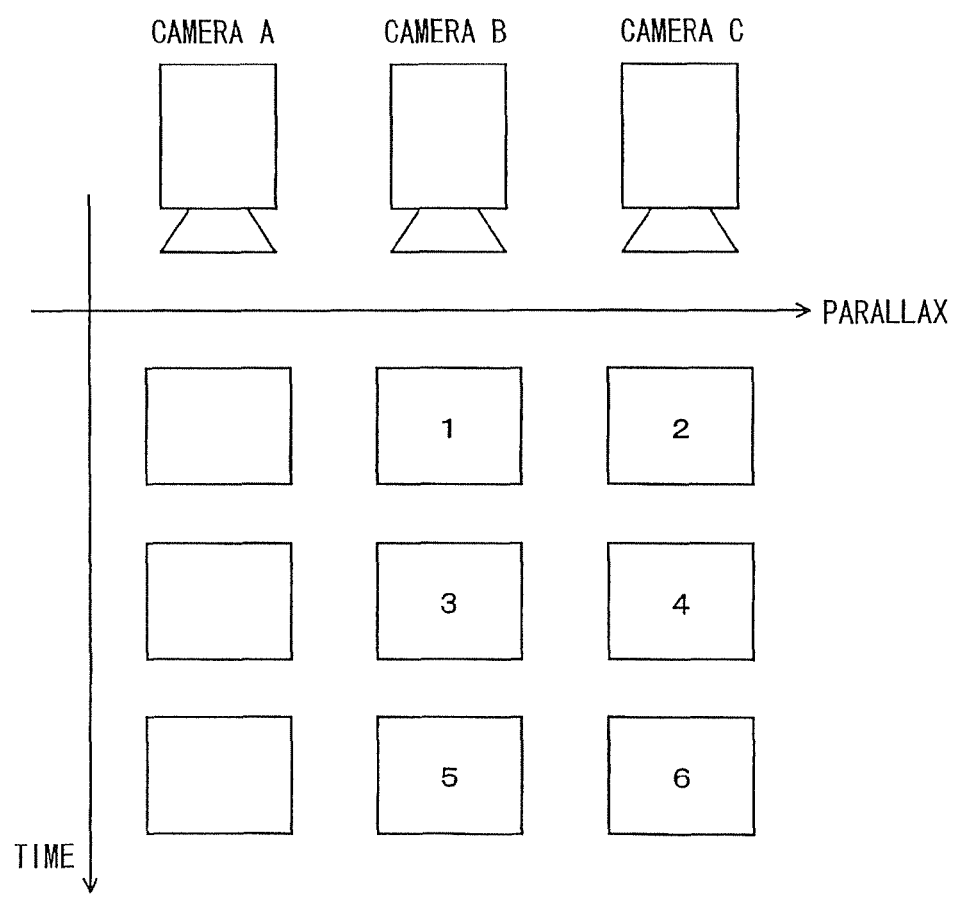
FIG. 2 is a schematic diagram showing the camera arrangement used in the embodiments.

FIG. 2 is a schematic diagram showing the camera arrangement used in the embodiments. In FIG. 2, each rectangle figure indicates frames of the relevant cameras, and images of cameras B and C are input in the order indicated by the shown numbers.

Figure 3:
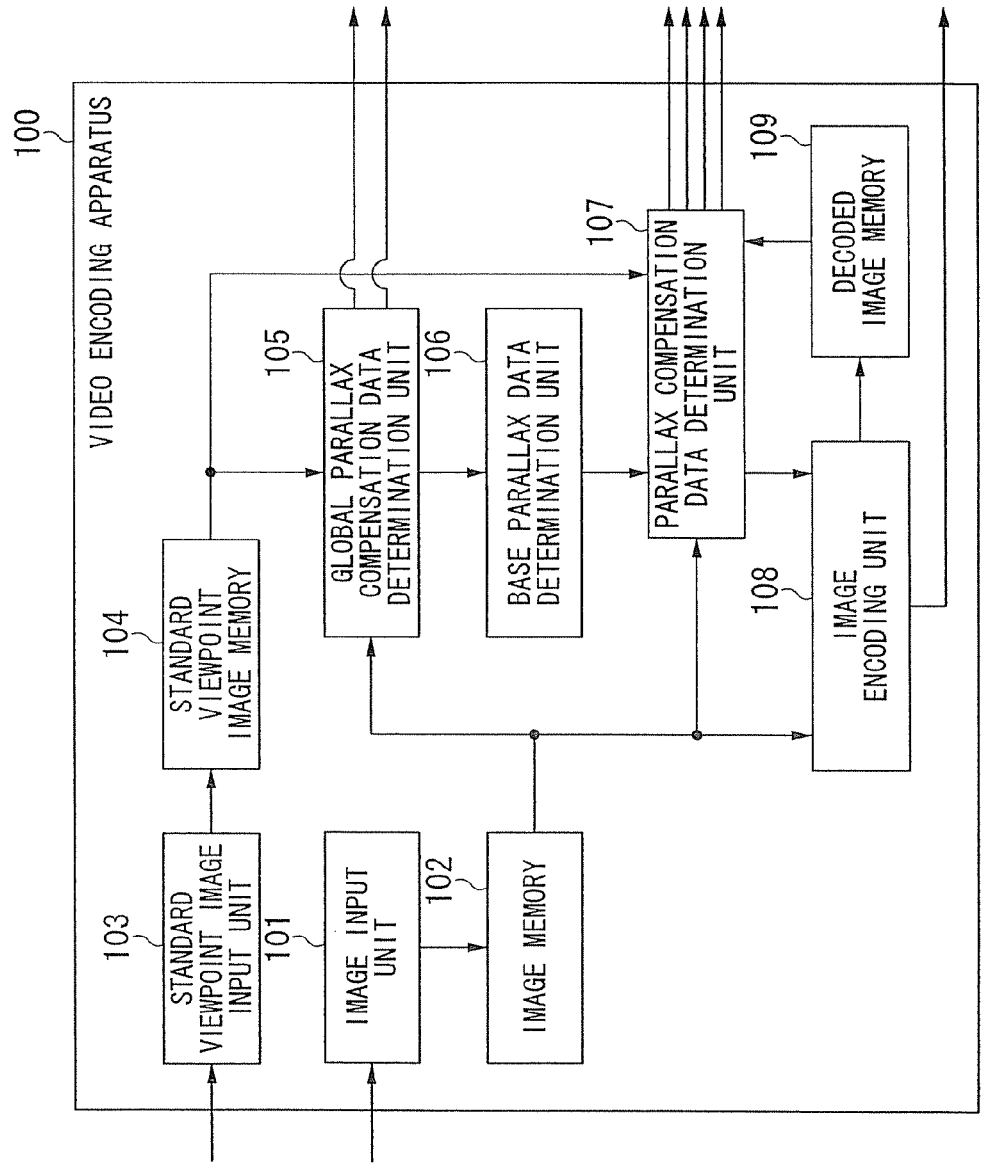
FIG. 3 is a diagram showing a video encoding apparatus as a first embodiment of the present invention.
Figure 4:
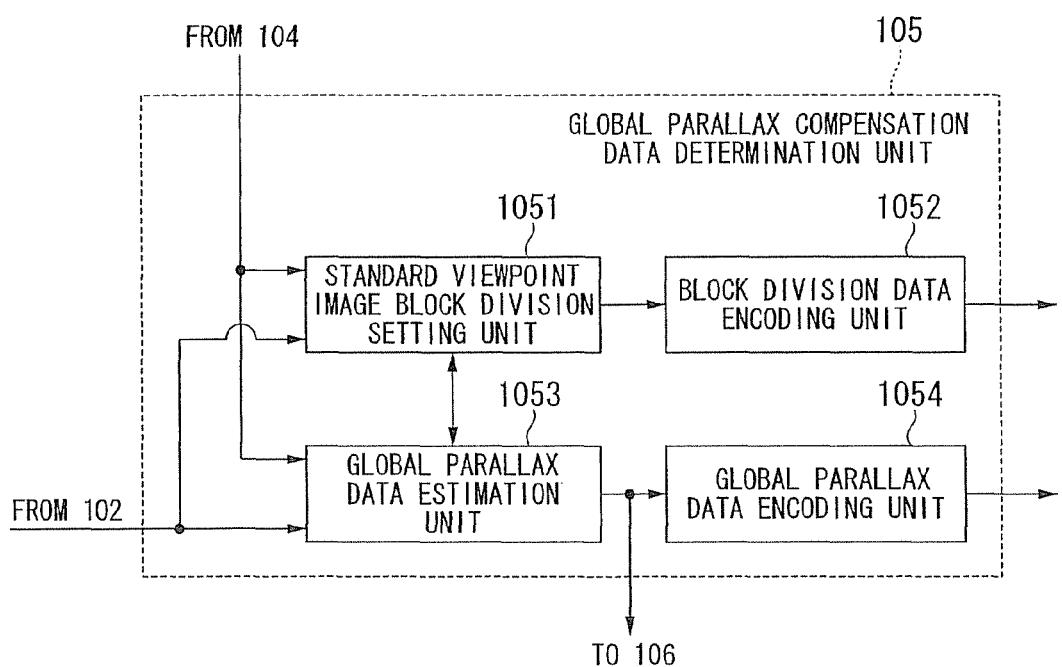
FIG. 4 is a diagram showing the detailed structure of the global parallax compensation data determination unit in FIG. 3.
Figure 5:
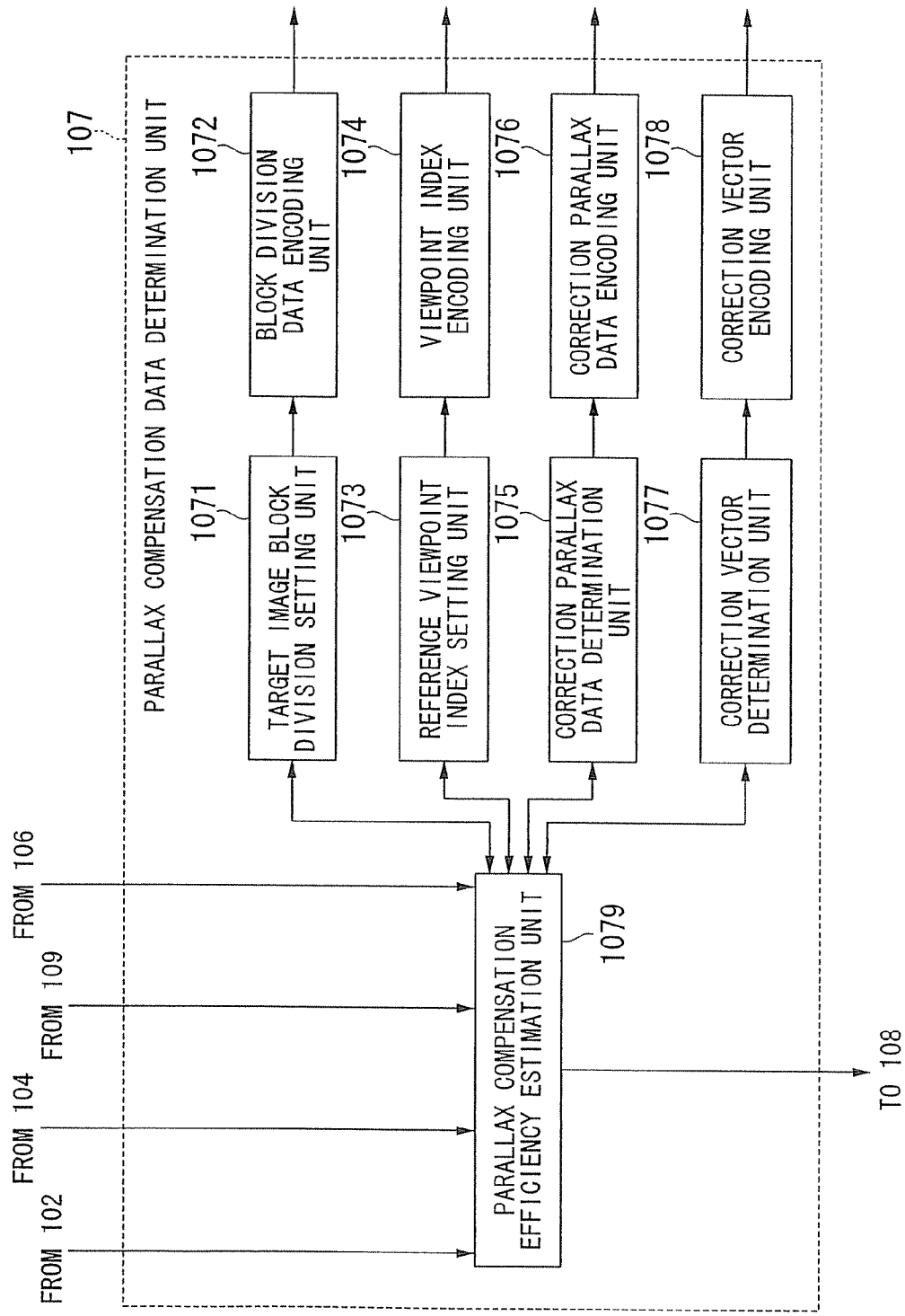
FIG. 5 is a diagram showing the detailed structure of the parallax compensation data determination unit in FIG. 3.

A first embodiment will be explained first. FIGS. 3, 4, and 5 show the structure of a video encoding apparatus as the first embodiment of the present invention.

As shown in FIG. 3, a video encoding apparatus 100 of the first embodiment has an image input unit 101 into which original images (as target images for encoding) of cameras B and C are input; an image memory 102 for storing the input images; a standard viewpoint image input unit 103 into which a decoded image of camera A (as the standard viewpoint) is input; a standard viewpoint image memory 104 for storing the input decoded image of the standard viewpoint; a global parallax compensation data determination unit 105 for determining global parallax data, which is parallax data (for the standard viewpoint) based on the Epipolar geometry constraint; a base parallax data determination unit 106 for determining base parallax data which is produced using the global parallax data and is parallax data (for the viewpoint of the target image for encoding) based on the Epipolar geometry constraint; a parallax compensation data determination unit 107 for determining data used for subjecting the target image to parallax compensation; an image encoding unit 108 for subjecting each input image to actual prediction encoding; and a decoded image memory 109 for storing an image decoded from the encoded input image.

FIG. 4 is a diagram showing the detailed structure of the global parallax compensation data determination unit 105.

As shown in FIG. 4, the global parallax compensation data determination unit 105 has a standard viewpoint image block division setting unit 1051 for setting a block division on the standard viewpoint image; a block division data encoding unit 1052 for encoding determined block division data; a global parallax data estimation unit 1053 for estimating the global parallax data for each block by using the set of input images; and a global parallax data encoding unit 1054 for encoding the obtained global parallax data.

The global parallax data obtained by the global parallax data estimation unit 1053 is communicated to the base parallax data determination unit 106.

In addition, encoded data output from the block division data encoding unit 1052 and the global parallax data encoding unit 1054 forms part of the data output from the video encoding apparatus 100.

FIG. 5 is a diagram showing the detailed structure of the parallax compensation data determination unit 107.

As shown in FIG. 5, the parallax compensation data determination unit 107 includes a target image block division setting unit 1071 for setting a block division on the target image for encoding; a block division data encoding unit 1072 for encoding determined block division data; a reference viewpoint index setting unit 1073 for setting a viewpoint index which indicates the viewpoint of an image used as a reference image in parallax compensation; a viewpoint index encoding unit 1074 for encoding the set viewpoint index; a correction parallax data determination unit 1075 for determining correction parallax data used for correcting the base parallax data based on the Epipolar geometry constraint; a correction parallax data encoding unit 1076 for encoding the determined correction parallax data; a correction vector determination unit 1077 for determining a correction vector used for correcting a corresponding relationship, which is provided by the base parallax data and the correction parallax data, regardless of the Epipolar geometry constraint; a correction vector encoding unit 1078 for encoding the determined correction vector; and a parallax compensation efficiency estimation unit 1079 for estimating the prediction efficiency when parallax compensation is performed using the data (determined by each relevant unit) for the parallax compensation.

A parallax-compensated image, which is determined to have the highest parallax compensation efficiency by the parallax compensation efficiency estimation unit 1079, is communicated to the image encoding unit 108.

In addition, encoded data output from the block division data encoding unit 1072, the viewpoint index encoding unit 1074, the correction parallax data encoding unit 1076, and the correction vector encoding unit 1078 form a part of the data output from the video encoding apparatus 100.

FIGS. 6 to 10 show operation flows executed by the video encoding apparatus 100 having the above structure. The processes performed by the video encoding apparatus 100 will be explained in detail in accordance with the flows.

Figure 6:
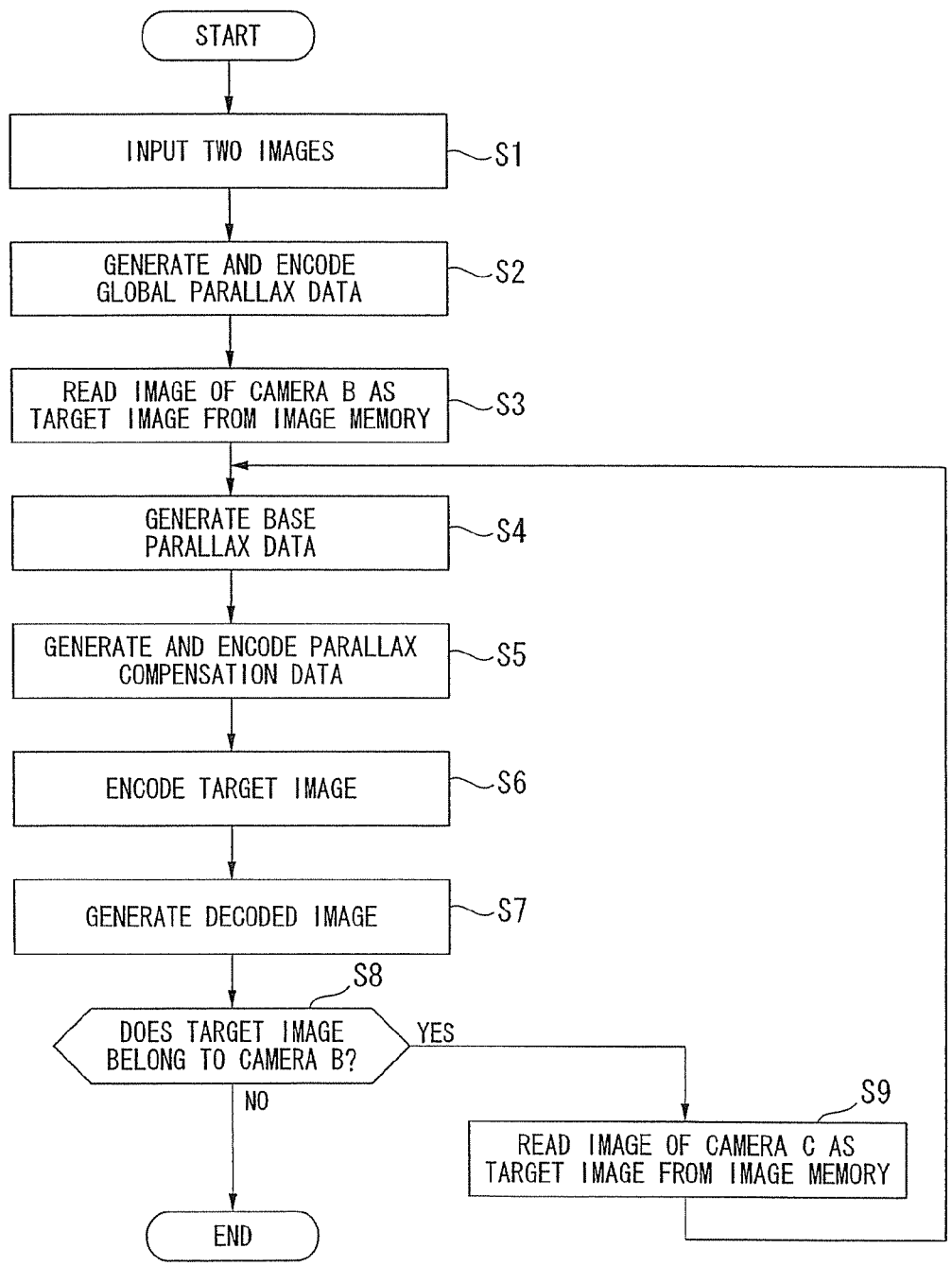
FIG. 6 is a flowchart of image encoding in the first embodiment.

FIG. 6 shows the general flow of the entire encoding process performed in the video encoding apparatus 100 of the first embodiment. In this flow, one image of camera B and one image of camera C, which were obtained at the same time, are encoded.

First, one image of camera B and one image of camera C, which were obtained at the same time, are input into the image input unit 101, and the images are stored in the image memory 102 (see step S1). Here, a decoded image of an image of camera A, which was obtained at the same time as the input images, was input into the standard viewpoint image input unit 103, and has been stored in the standard viewpoint image memory 104.

Next, in the global parallax compensation data determination unit 105, global parallax data (for the standard viewpoint image) which satisfies the Epipolar geometry constraint is determined, and is encoded (see step S2). This process will be explained later with reference to FIG. 7.

The process from step S4 to S7 is applied to each image in the image memory 102. Here, it is assumed that the image of camera B is first encoded and then the image of camera C is encoded.

That is, the image of camera B is read from the image memory 102 and is determined as a target image for encoding (see step S3), and the global parallax data determined in step S2 is converted by the base parallax data determination unit 106 into base parallax data which is assigned to the target image and is based on the Epipolar geometry constraint (see step S4). Based on the base parallax data, the other parallax compensation data such as a reference viewpoint index, correction parallax data, and a correction vector is computed in consideration of the encoding efficiency, and is then encoded (see step S5). The image encoding unit 108 then performs encoding by using the computed parallax data (see step S6).

The encoded image is then decoded and stored in the decoded image memory 109 (see step S7). If the decoded image belongs to camera B (see step S8), the image of camera C is then read from the image memory 102, and encoding is performed through a similar process (see steps S4 to S7), so as to complete the entire operation. The processes performed in steps S4 and S5 will be explained in detail later.

Figure 7:
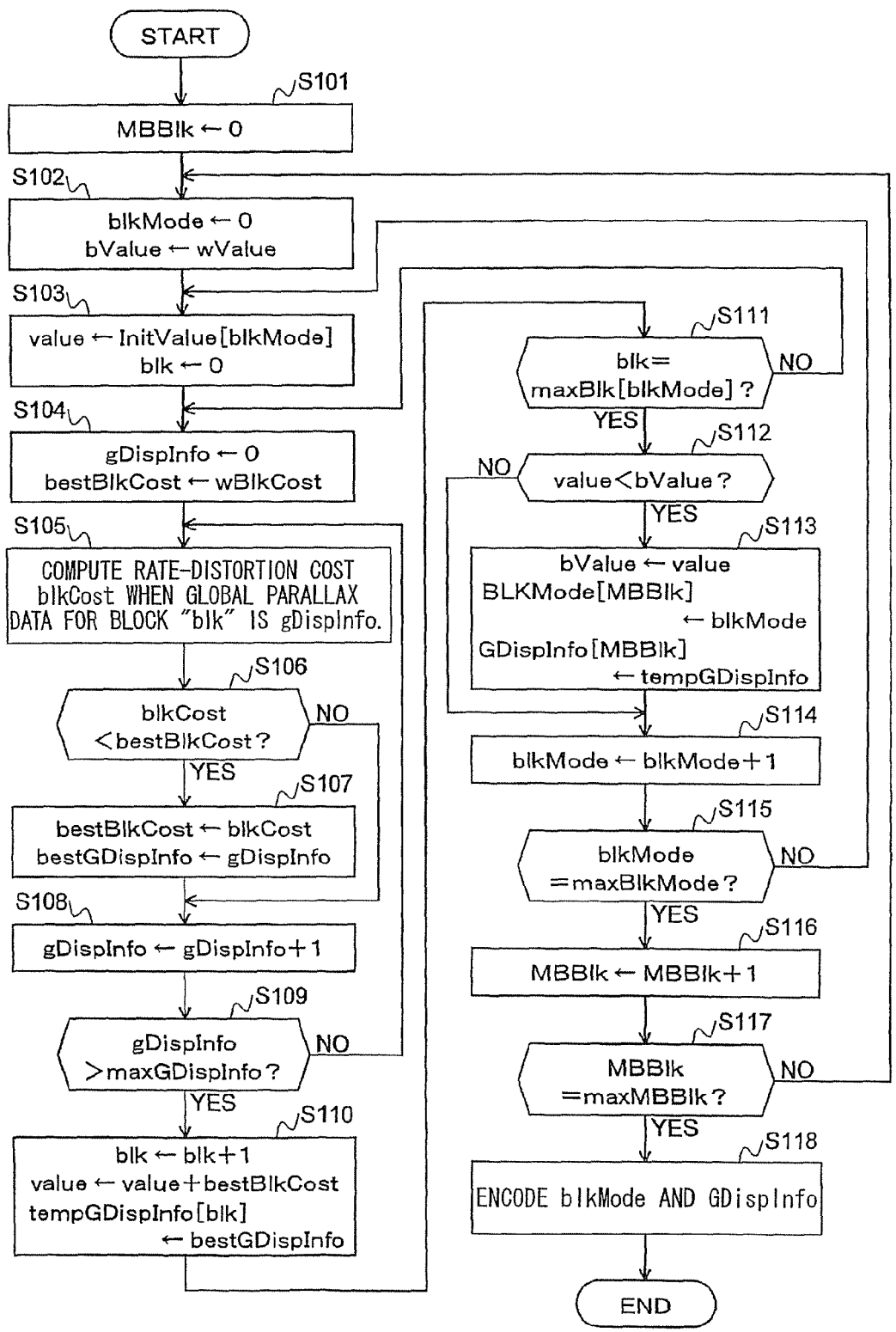
FIG. 7 is a detailed flowchart of step S2 in FIG. 6.

FIG. 7 shows a detailed operation flow of step S2 performed by the global parallax compensation data determination unit 105.

In the first embodiment, a block division is set for each macroblock formed by 16×16 pixels, and blocks are produced in each macroblock by the block division. The global parallax data is determined and encoded for each divided block (simply called a "block"). A block having a larger size than the macroblock may be used.

Figure 8:
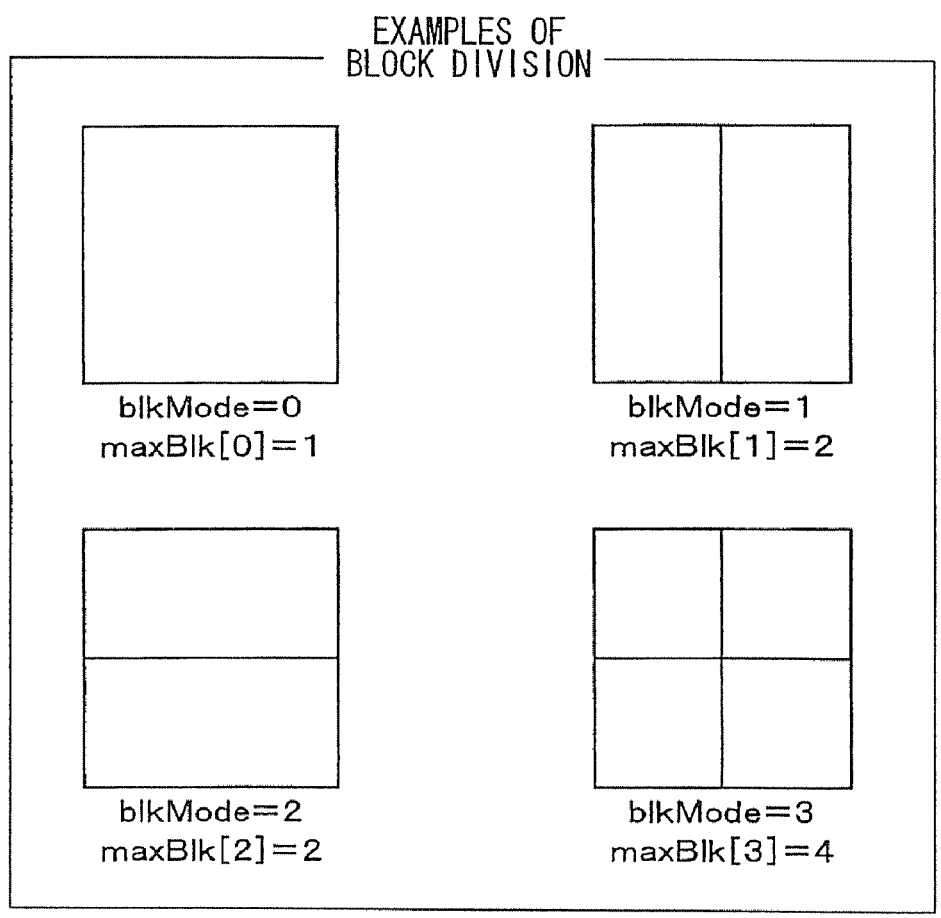
FIG. 8 is a diagram showing examples of block division applied to a macroblock.

For the macroblock, there are many possible block division forms, and FIG. 8 shows examples of them. As shown in FIG. 8, "blkMode" is an index showing the type of the block division, and "maxBlk[blkMode]" represents the number of blocks for block division "blkMode". Additionally, "maxBlkMode" represents the number of types of block division.

In addition, "MBBlk" is an index of each macroblock, and "maxMBBlk" indicates the number of macroblocks.

Therefore, in the relevant process, after the index MBBlk of the macroblock is initialized to zero (see step S101), the process from step S102 to Step S115 is repeatedly performed while MBBlk is incremented by one (see step S116), until MBBlk reaches "maxMBBlk" (see step S117).

After that, the determined block division data BLKMode and the global parallax data GDispInfo are respectively encoded by the block division data encoding unit 1052 and the global parallax data encoding unit 1054 (see step S118).

In the process applied to each macroblock, the block division is estimated for each block division candidate, and the candidate having the highest estimated value is determined as the block division applied to the macroblock.

That is, after block division "blkMode" is initialized to zero and the best estimated value "bValue" for the macroblock is initialized to "wValue" corresponding to the worst estimated value which can never be obtained (see step S102), the following process is repeatedly performed while blkMode is incremented by one (see step S114), until blkMode reaches maxBlkMode (see step S115). In the repeated process, an estimated value called "value" for the block division blkMode is computed (see steps S103 to S111), the block division which provides the best estimated value is determined by comparing "value" with "bValue" (see step S112), the determined block division for the relevant macroblock is stored as BLKMode[MBBlk], and the relevant global parallax data is stored as GDispInfo[MBBlk] (see step S113).

The estimated value called "value" for the block division blkMode can be obtained by computing the total sum of individual rate-distortion costs of parallax compensation for the divided blocks.

That is, when "blk" is an index indicating each divided block, "blk" is initialized to zero and "value" is initialized to an estimated value InitValue[blkMode] provided for the block division blkMode (see step S103). Then, a process (see steps S104 to S109) for determining the global parallax data which produces the best rate-distortion cost for each block is repeatedly performed while step S110 is executed, until "blk" reaches maxBlk[blkMode] (see step S111). In step S110, 1 is added to "blk", the best rate-distortion cost "bestBlkCost" set for each block is added to "value", and the global parallax data which produces the best rate-distortion cost for each block is stored in tempGDispInfo[blk].

Additionally, InitValue[blkMode] is a predetermined value depending on the amount of code necessary for encoding the data which indicates that the block division is blkMode.

In the process of determining (for the relevant block) the global parallax data which provides the best rate-distortion cost, when "maxGDispInfo" represents the maximum value of the index "gDispInfo" indicating each global parallax data candidate, gDispInfo is initialized to zero, and the best rate-distortion cost "bestBlkCost" for the block is initialized to the worst value "wBlkCost" which can never be obtained (see step S104). Then, the following process is repeatedly performed while gDispInfo is incremented by one (see step S108), until gDispInfo exceeds maxGDispInfo (see step S109). In the repeated process, the rate-distortion cost blkCost for the global parallax data gDispInfo is computed (see step S105), the global parallax data which provides the best rate-distortion cost is determined by comparing "blkCost" with "bestBlkCost" (see step S106), and the determined global parallax data is stored as "bestGDispInfo" (see step S107).

The rate-distortion cost blkCost for the global parallax data gDispInfo can be computed by the following formula.

$$blkCost = D_1 + \lambda_1 \cdot Rate(gDispInfo) \quad \text{[Formula 1]}$$

$$D_1 = \sum_{cam} \sum_{pix} \left| \begin{array}{c} Value(base, pix) - \\ Value(cam, Trans(base, cam, pix, d_{base}(gDispInfo))) \end{array} \right|$$

Here, $\lambda_1$ is an undefined Lagrange multiplier, and is a predetermined value. In addition, "Rate( )" is a function which returns an amount of code or a predicted value thereof, which is necessary for encoding the global parallax data indicated by the argument.

$\Sigma_{cam}$ is the sum of "cam∈{camera B, camera C}", and $\Sigma_{pix}$ is the sum of "pix∈{pixels in the block}".

"$d_{base}( )$" is a function which returns a value of the distance from the standard viewpoint, which is indicated by the global parallax data index (provided as the argument), to the imaged object.

"Value( )" is a function which returns the pixel value at the pixel position (provided as the second argument) on an image of a viewpoint provided as the first argument.

On an image of viewpoint "src", when the distance from the viewpoint of a pixel at position "pix" to the imaged object is "d", "Trans(src, dst, pix, d)" is a function which returns a corresponding pixel "p" (to pixel "pix") on an image of viewpoint "dst". Here, "p" can be computed by the following formula.

$$\tilde{p} = A_{dst} R_{dst}^{-1} \{ R_{src} A_{src}^{-1} \hat{pix} d + t_{src} - t_{dst} \} \quad \text{[Formula 2]}$$

In the formula, A, R, and t indicate camera parameters, and respectively show an internal parameter, a rotation parameter, and a translational parameter. The internal and rotation parameters are each a 3×3 matrix, and "t" is a three dimensional vector.

In addition, "p" to which "~" is disposed thereon indicates homogeneous coordinates, and "pix" to which "^" is disposed thereon specifically indicates homogeneous coordinates whose third component is 1, among all homogeneous coordinates of "pix".

The homogeneous coordinates for two-dimensional coordinates have three components. The coordinates, whose first and second components are obtained by dividing the first and second components of the homogeneous coordinates by the third component of the homogeneous coordinates, is ordinary coordinates corresponding to the relevant homogeneous coordinates. In addition, the camera parameters can be represented by any form In the present embodiment, camera parameters by which corresponding points between the cameras can be computed by the above formula are employed.

Figure 9:
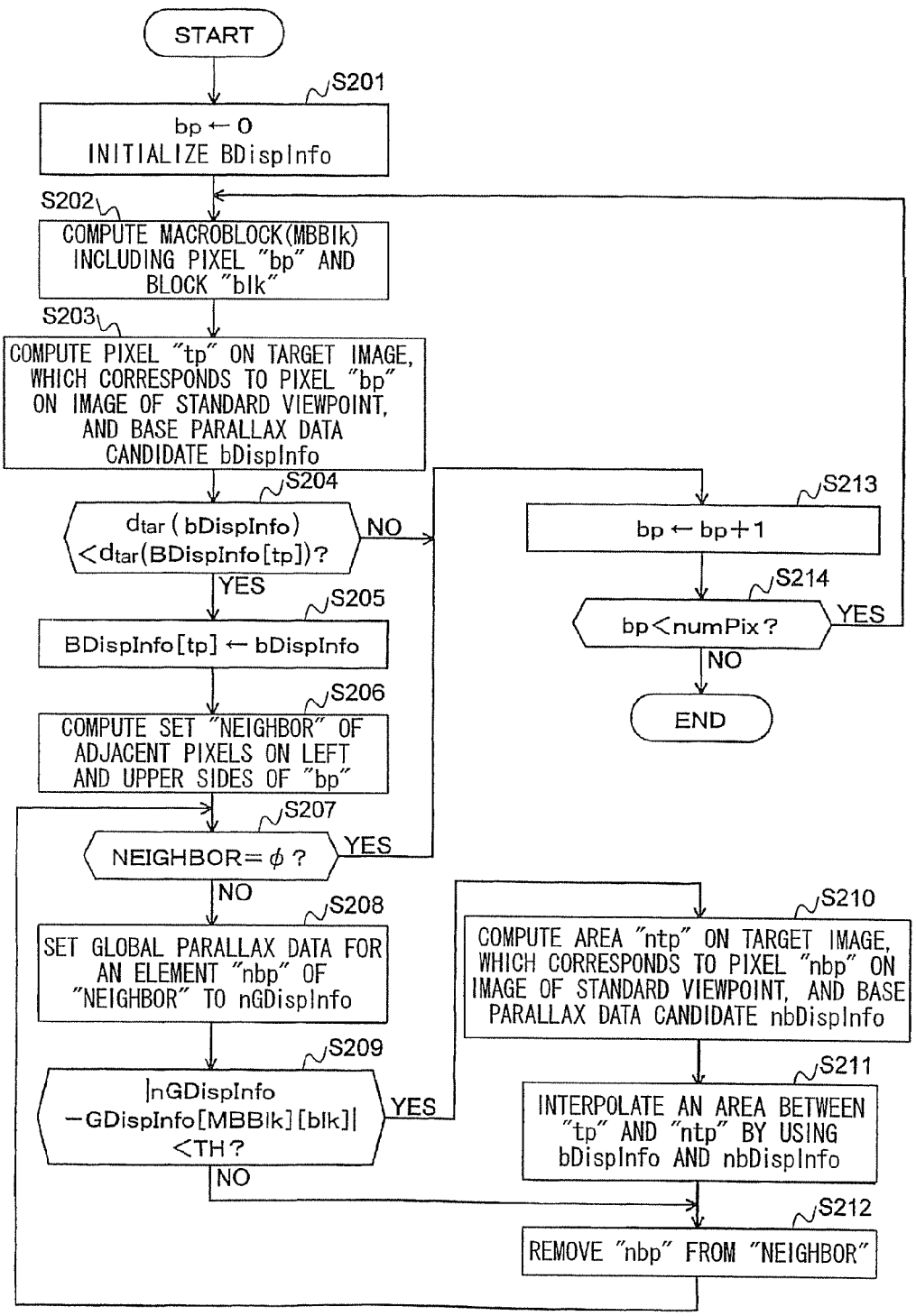
FIG. 9 is a detailed flowchart of step S4 in FIG. 6.

FIG. 9 is a detailed operation flow of step S4 performed by the base parallax data determination unit 106.

This process is applied to each pixel in an image obtained from the standard viewpoint.

That is, after an pixel index "bp" is initialized to zero (see step S201), the process from step S202 to S212 is repeatedly performed while "bp" is incremented by 1 (see step S213), until "bp" reaches the number "numPix" of pixels in the relevant image (see step S214).

In addition, "BDispInfo" indicates the entire base parallax data, and the base parallax data for a designated position is represented using "[ ]". At the beginning of the flow, the base parallax data is initialized to a large value which can never be obtained (see step S201).

Although the processing order of pixels is not limited, the process is performed in a raster scan form in the first embodiment.

In the repeated process applied to each pixel, first, a macroblock "MBBlk" which includes the pixel "bp" and the block index "blk" determined in accordance with the block division (which was set when the global parallax data was determined) are obtained (see step S202).

Next, a pixel "tp" (on the target image for encoding) corresponding to the pixel "bp" and a base parallax data candidate "bDispInfo" are computed based on the global parallax data GDispInfo[MBBlk][blk] by using the following formula (see step S203).

$$t\hat{p}d_{tar}(b\text{DispInfo})=A_{tar}R_{tar}^{-1}\{R_{base}A_{base}^{-1}b\hat{p}d_{base}(G\text{DispInfo}[MBBlk][blk])+t_{base}-t_{tar}\}$$ [Formula 3]

In the formula, "tar" indicates the viewpoint of the target image for encoding, and $d_{tar}(\ )$ is a function which returns a value of the distance from the viewpoint of the target image, which is indicated by a parallax data index (i.e., base parallax data candidate "bDispInfo") provided as the argument, to the imaged object.

That is, the (position of) pixel "tp" and the base parallax data candidate at pixel "tp" are computed by using (i) (position of) pixel "bp", (ii) the distance from the standard viewpoint to the imaged object, where the distance is indicated by global parallax data for pixel "bp", (iii) camera parameters of the standard viewpoint, and (iv) camera parameters of the viewpoint of the target image.

However, the (position of) pixel "tp" and the distance from the viewpoint of the target image to the imaged object for the pixel "tp" are directly computed, and the latter value is converted to a base parallax data candidate (bDispInfo) for pixel "tp" by using an inverse function of the function $d_{tar}$.

The above-computed bDispInfo is compared with the already-computed base parallax data BDispInfo[tp] at the relevant position, where the actual measure of the comparison is the distance (indicated by the base parallax data (candidate)) from the viewpoint of the target image to the imaged object (see step S204). If the distance indicated by bDispInfo is not smaller, it is determined that an occlusion (i.e., a part which cannot be viewed by the camera) has been produced, and the operation applied to the relevant pixel is terminated.

If the distance indicated by bDispInfo is smaller, the value of BDispInfo[tp] is updated using bDispInfo (see step S205).

Next, BDispInfo is updated by means of continuity of an object in the actual space. That is, NEIGHBOR, which is a set of adjacent pixels positioned on the left and upper sides of "bp", is generated (see step S206). Then the following process (step S208 to S211) is repeatedly performed while the pixel, for which the relevant process has been completed, is removed (see step S212), until the set NEIGHBOR becomes empty (see step S207).

In the process applied to each element of NEIGHBOR, first, global parallax data of "nbp", which is an element of NEIGHBOR, is obtained using GDispInfo, and is stored as nGDispInfo (see step S208).

Next, the absolute value of the difference between nGDispInfo and GDispInfo[MBBlk][blk] is compared with a predetermined threshold TH (see step S209).

If the absolute value is greater than or equal to the threshold, it indicates that the relevant object does not have continuity in the actual space, and the operation for the element is terminated.

If the absolute value is smaller than the threshold, pixel "ntp" on the target image, which corresponds to pixel "nbp", and base parallax data nbDispInfo for "ntp" are computed using the formula in the above step S203 (see step S210).

The base parallax data for a pixel between "tp" and "ntp" is computed by means of interpolation using bDispInfo and nbDispInfo (see step S211).

Although any method for performing interpolation using data of both relevant ends can be used, in the most simple method, the center is linear-interpolated using base parallax data at both ends. If base parallax data having a value smaller than the computed interpolated value has already existed, it is determined that an occlusion has occurred, and no updating is performed.

In the first embodiment, for each pixel, the computation for obtaining a corresponding pixel on the target image and relevant base parallax data by using the pixel position and the global parallax data is repeatedly performed. However, the computation in step S210 is performed using the formula in the above step S203. Therefore, if the result of the process in step S203 can be stored, repetition is unnecessary for each pixel by using the stored value, thereby reducing the amount of computation.

Figure 10:
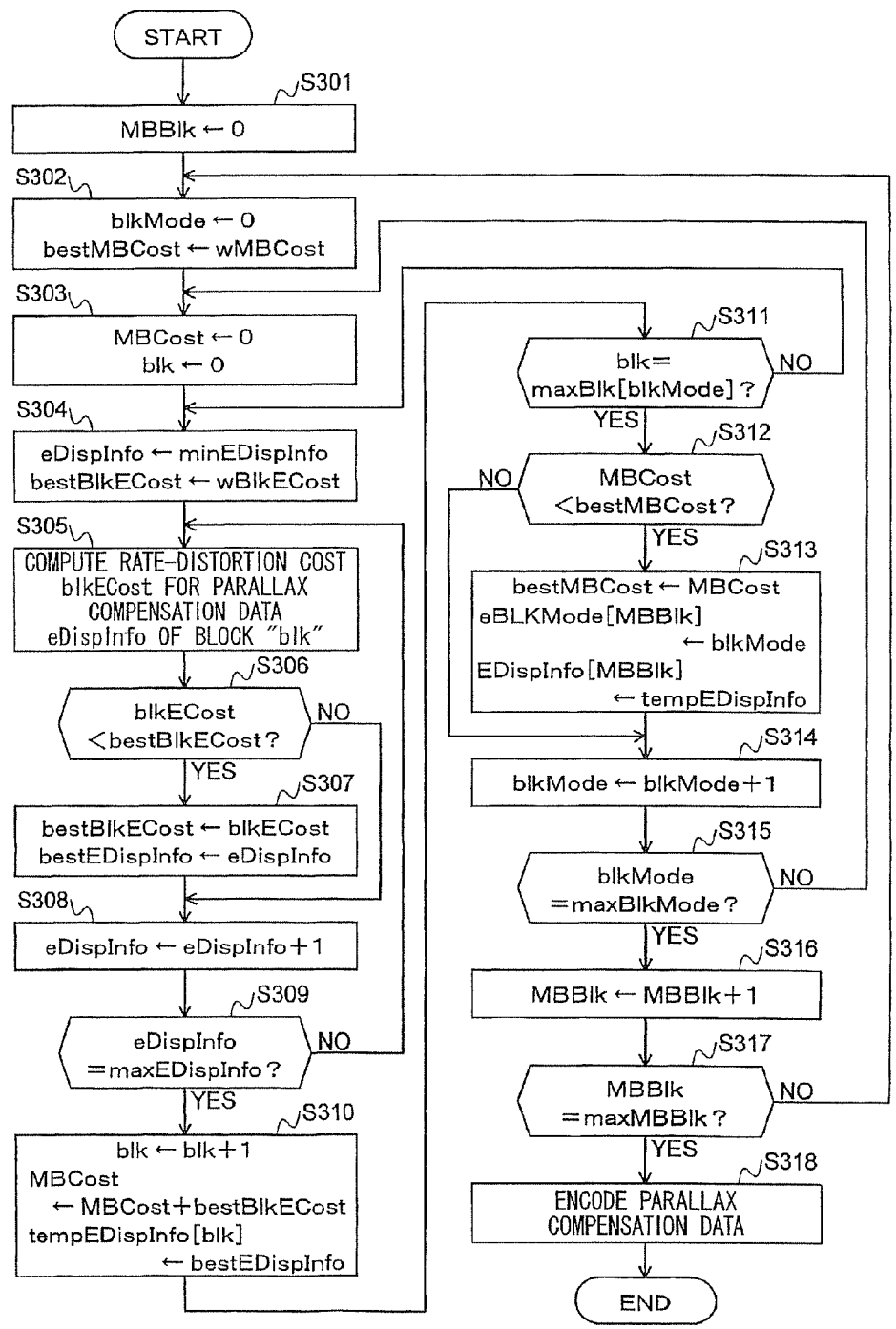
FIG. 10 is a detailed flowchart of step S5 in FIG. 6.

FIG. 10 shows a detailed operation flow of step S5 performed in the parallax compensation data determination unit 107.

In the first embodiment, a block division is determined for each macroblock, and a reference viewpoint index, correction parallax data, and a correction vector are computed and encoded for each block. In the present embodiment, the reference viewpoint index, the correction parallax data, and the correction vector, which are obtained for each block, are called "parallax compensation data". For each block, data used for parallax compensation is not only the parallax compensation data but also base parallax data. That is, the parallax compensation data is used for correcting the base parallax data.

Accordingly, after the macroblock index MBBlk is initialized to zero (see step S301), the process (in steps S302 to S315) for determining the block division in consideration of the parallax compensation data is repeatedly performed while MBBlk is incremented by 1 (see step S316), until MBBlk reaches maxMBBlk (see step S317). The computed parallax compensation data is encoded by the block division data encoding unit 1072, the viewpoint index encoding unit 1074, the correction parallax data encoding unit 1076, and the correction vector encoding unit 1078 (see step S318).

In the process of determining the block division in consideration of the parallax compensation data, after initializing the block division data blkMode is initialized to zero (see step S302), the following process is repeatedly performed while blkMode is incremented by 1 (see step S314), until blkMode reaches maxblkMode (see step S315). In the repeated process, a rate-distortion cost MBCost of the macroblock is computed in consideration of the parallax compensation data (see steps S303 to S311), MBCost is then compared with the already-computed minimum cost bestMBCost (see step S312), and the block division which produces a smaller cost is determined as the block division eBLKMode[MBBlk] of the relevant macroblock (see step S313).

In addition, bestMBCost is first initialized to the maximum value "wMBCost" which can never be computed (see step S302).

In the process of computing the rate-distortion cost of the macroblock in consideration of the parallax compensation data, after the block index "blk" is initialized to zero (see step S303), the process (steps S304 to S309) for computing (for each block) parallax compensation data bestEDispInfo, which produces the minimum rate-distortion cost, and the corresponding rate-distortion cost "bestBlkECost" is repeatedly performed while "blk" is incremented by 1 (see step S310), until "blk" reaches maxBlk[blkMode] (see step S311).

The rate-distortion cost MBCost for each macroblock is first initialized to zero (see step S303), and then computed by accumulating the minimum rate-distortion cost bestBlkCost after the process for each block has completed (see step S310).

In addition, the determined parallax compensation data is stored as tempEDispInfo[blk] (see step S310), and if it has the best value in consideration of the finally-obtained rate-distortion cost of the macroblock, then it is stored as EDispInfo [MBBlk] (see step S313).

In the process of computing the minimum rate-distortion cost of each block, after a parallax compensation data index "eDispInfo", which corresponds to the relevant set of the reference viewpoint index, the correction parallax data, and the correction vector, is initialized to zero (see step S304), the following process is repeatedly performed while eDispInfo is incremented by 1 (see step S308), until eDispInfo reaches maxEDispInfo which indicates the number of combinations between the reference viewpoint index, the correction parallax data, and the correction vector (see step S309).

In the repeated process, a rate-distortion cost blkECost for the parallax compensation data corresponding to eDispInfo is computed (see step S305), and if blkECost is smaller than the already-computed minimum rate-distortion cost bestBlkECost (see step S306), then eDispInfo is stored as bestEDispInfo, and bestBlkECost is updated using blkECost (see step S307).

In addition, bestBlkECost is first initialized to the maximum value "wBlkECost" which can never be computed (see step S304).

The computation of the rate-distortion cost in step S306 is performed using the following formula.

$$blkECost = D_2 + \lambda_2 \cdot Code(eDispInfo) \quad \text{[Formula 4]}$$

$$D_2 = \sum_{Tp \in \{pixels\ in\ block\}} |Value(tar, Tp) - Value(ref, Rp)|$$

$$Rp = Trans(tar, ref, Tp, d_{tar}(BDispInfo[Tp]) + md) + cmv$$

Here, $\lambda_2$ is an undefined Lagrange multiplier, and is a predetermined value. In addition, "tar" indicates the viewpoint of the target image for encoding, and "ref", "md", and "cmv" respectively represent the reference viewpoint index, the correction parallax data, and the correction vector which are indicated by the parallax compensation data index "eDispInfo".

Next, a second embodiment will be explained. FIGS. 11, 12, 13, and 14 show the structure of a video encoding apparatus in the second embodiment of the present invention.

Figure 11:
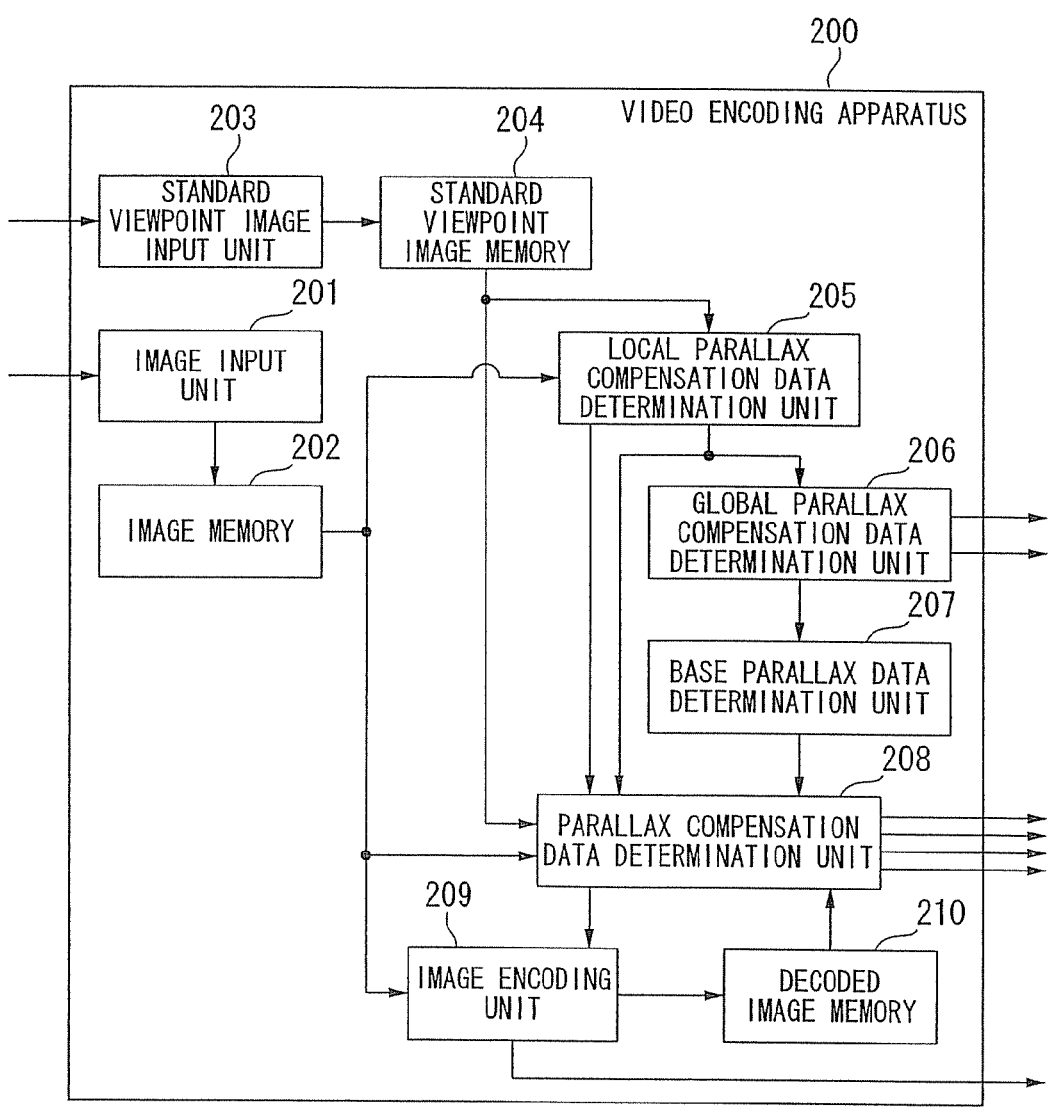
FIG. 11 is a diagram showing a video encoding apparatus as a second embodiment of the present invention.

As shown in FIG. 11, a video encoding apparatus 200 of the second embodiment has an image input unit 201 into which original images (as target images for encoding) of cameras B and C are input; an image memory 202 for storing the input images; a standard viewpoint image input unit 203 into which a decoded image of camera A (as the standard viewpoint) is input; a standard viewpoint image memory 204 for storing the input decoded image of the standard viewpoint; a local parallax compensation data determination unit 205 for determining local parallax data, which is parallax data (for each target image for encoding) based on the Epipolar geometry constraint; a global parallax compensation data determination unit 206 for determining and encoding global parallax data, which is parallax data (for the standard viewpoint) based on the Epipolar geometry constraint, by using the local parallax data determined for each target image; a base parallax data determination unit 207 for determining base parallax data which is produced by converting the global parallax data and is parallax data (for the viewpoint of each target image for encoding) based on the Epipolar geometry constraint; a parallax compensation data determination unit 208 for determining data used for subjecting the target image to parallax compensation; an image encoding unit 209 for subjecting each input image to actual prediction encoding; and a decoded image memory 210 for storing an image decoded from the encoded input image.

If the image encoding unit 209 has a memory for storing a decoded image so as to use an already-encoded image, the memory can also function as the decoded image memory 210.

Figure 12:
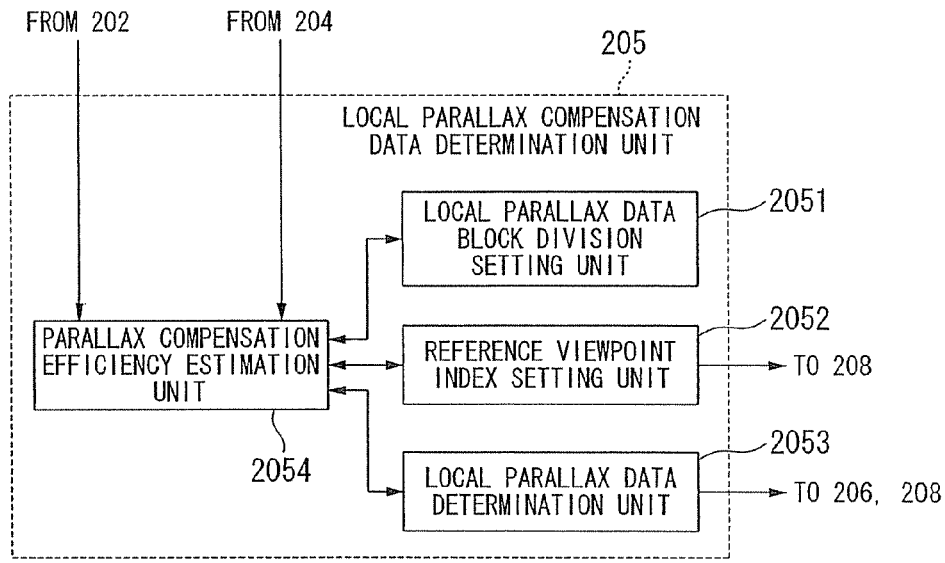
FIG. 12 is a diagram showing the detailed structure of the local parallax compensation data determination unit in FIG. 11.

FIG. 12 is a diagram showing the detailed structure of the local parallax compensation data determination unit 205.

As shown in FIG. 12, the local parallax compensation data determination unit 205 has a local parallax data block division setting unit 2051 for setting a block division on the target image for encoding, so as to determine local parallax data; a reference viewpoint index setting unit 2052 for setting a viewpoint index which indicates the viewpoint of an image used as a reference image in parallax compensation; a local parallax data determination unit 2053 for determining parallax data based on the Epipolar geometry constraint; and a parallax compensation efficiency estimation unit 2054 for estimating the efficiency when parallax compensation is performed using the set block division, the reference viewpoint index, and the parallax compensation, so as to provide feedback data to each setting or determination unit.

The first viewpoint index set by the reference viewpoint index setting unit 2052 is communicated to the parallax compensation data determination unit 208, and the local parallax data determined by the local parallax data determination unit 2053 is communicated to the global parallax compensation data determination unit 206 and the parallax compensation data determination unit 208.

Figure 13:
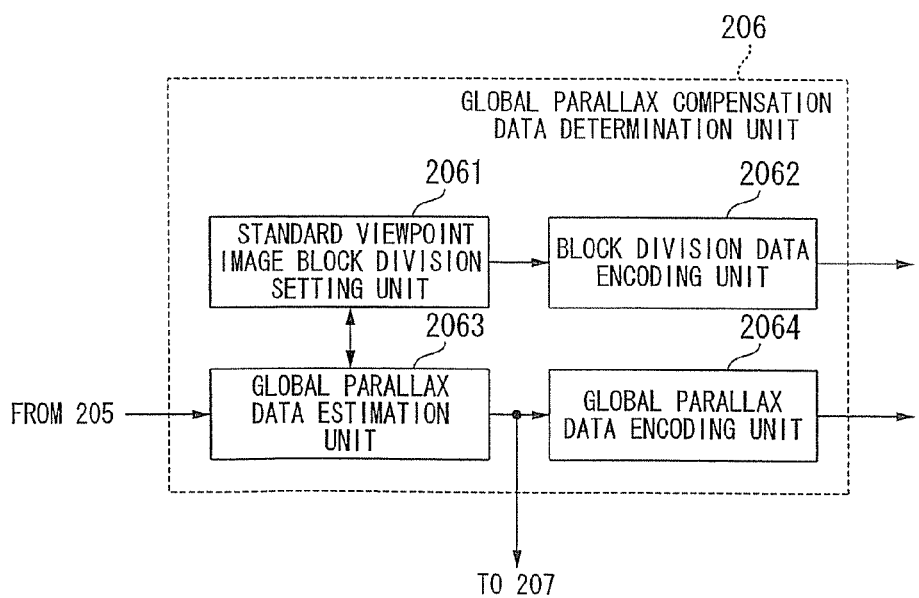
FIG. 13 is a diagram showing the detailed structure of the global parallax compensation data determination unit in FIG. 11.

FIG. 13 is a diagram showing the detailed structure of the global parallax compensation data determination unit 206.

As shown in FIG. 13, the global parallax compensation data determination unit 206 has a standard viewpoint image block division setting unit 2061 for setting a block division on an image of the standard viewpoint; a block division data encoding unit 2062 for encoding the determined block division data; a global parallax data estimation unit 2063 for estimating the global parallax data for each block by using the local parallax data communicated from the local parallax data determination unit 2053 in the local parallax compensation data determination unit 205; and a global parallax data encoding unit 2064 for encoding the determined global parallax data.

The global parallax data determined by the global parallax data estimation unit 2063 is communicated to the base parallax data determination unit 207.

In addition, encoded data output from the block division data encoding unit 2062 and the global parallax data encoding unit 2064 form a part of the data output from the video encoding apparatus 200.

Figure 14:
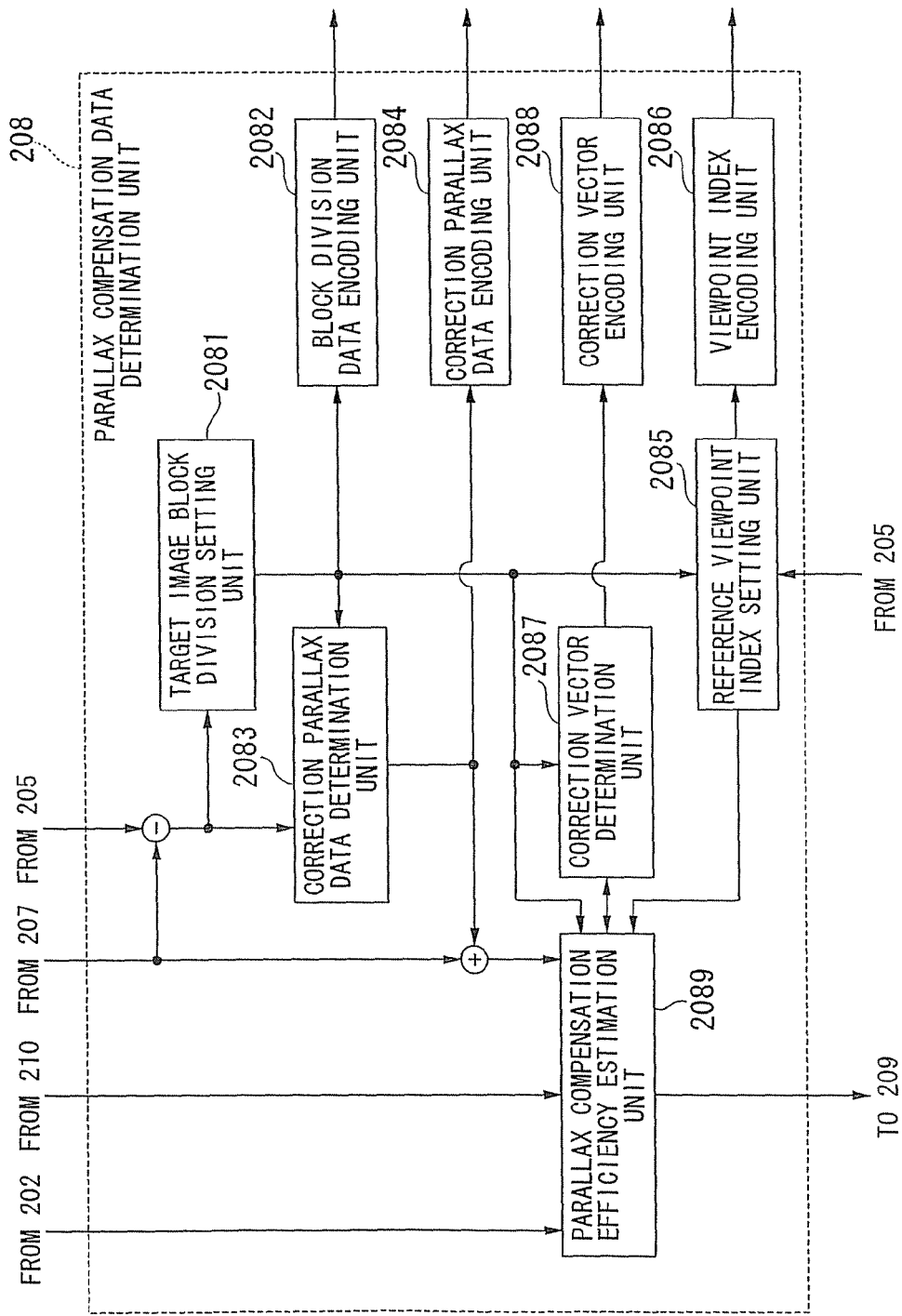
FIG. 14 is a diagram showing the detailed structure of the parallax compensation data determination unit in FIG. 11.

FIG. 14 is a diagram showing the detailed structure of the parallax compensation data determination unit 208.

As shown in FIG. 14, the parallax compensation data determination unit 208 has a target image block division setting unit 2081 for setting a block division on the target image for encoding by using the difference between the base parallax data communicated from the base parallax data determination unit 207 and the local parallax data communicated from the local parallax data determination unit 2053; a block division data encoding unit 2082 for encoding the determined block division data; a correction parallax data determination unit 2083 for determining correction parallax data used for correcting the base parallax data based on the Epipolar geometry constraint by using the determined block division data and the above difference; a correction parallax data encoding unit 2084 for encoding the determined correction parallax data; a reference viewpoint index setting unit 2085 for setting a reference viewpoint index for each block by using the first viewpoint index communicated from the reference viewpoint index setting unit 2052 in the local parallax compensation data determination unit 205 and the block division data; a viewpoint index encoding unit 2086 for encoding the set viewpoint index; a correction vector determination unit 2087 for determining a correction vector used for correcting a corresponding relationship regardless of the Epipolar geometry constraint, where the corresponding relationship is provided by data based on the Epipolar geometry constraint; a correction vector encoding unit 2088 for encoding the determined correction vector; and a parallax compensation efficiency estimation unit 2089 for estimating the prediction efficiency when parallax compensation is performed using the data determined by each relevant unit, so as to provide feedback data to the correction vector determination unit 2087.

A parallax-compensated image, which is determined by the parallax compensation efficiency estimation unit 2089 to have the best parallax compensation efficiency, is communicated to the image encoding unit 209.

In addition, encoded data output from the block division data encoding unit 2082, the correction parallax data encoding unit 2084, the viewpoint index encoding unit 2086, and the correction vector encoding unit 2088 form a part of the data output from the video encoding apparatus 200.

FIGS. 15 to 18 show operation flows performed by the video encoding apparatus 200 having the above-described structure. The processes performed by the video encoding apparatus 200 will be explained in detail in accordance with the operation flows.

Figure 15:
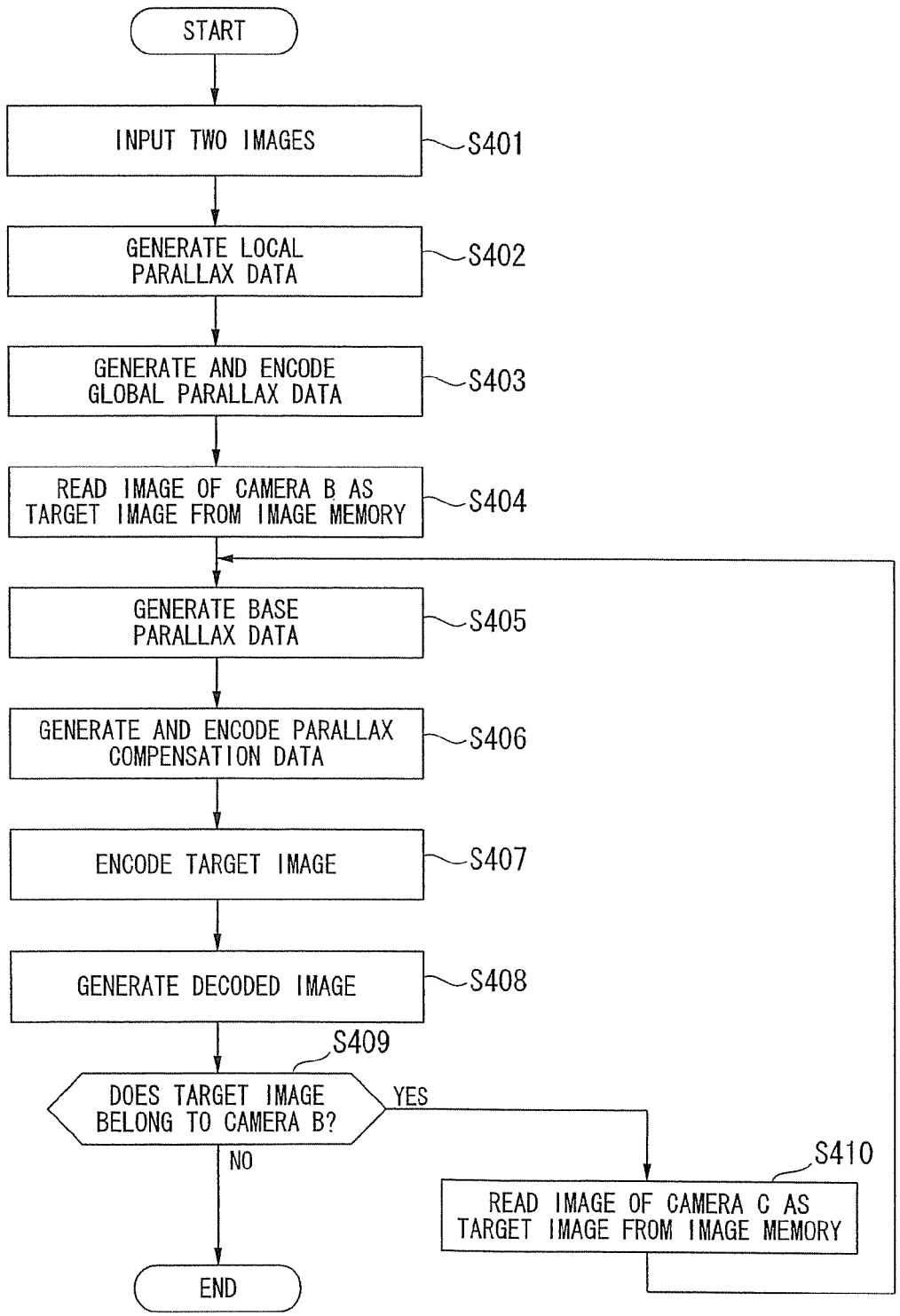
FIG. 15 is a flowchart of image encoding in the second embodiment.

FIG. 15 shows the general flow of the entire encoding process performed by the video encoding apparatus 200. In this flow, an image obtained by camera B and an image obtained by camera C, which were obtained at the same time, are encoded.

First, one image of camera B and one image of camera C, which were obtained at the same time, are input into the image input unit 201, and the images are stored in the image memory 202 (see step S401). Here, a decoded image of an image of camera A, which was obtained at the same time as the input images, was input into the standard viewpoint image input unit 203, and has been stored in the standard viewpoint image memory 204.

Next, in the local parallax compensation data determination unit 205, local parallax data is determined for each image in the relevant image memory by using the images stored in the image memory 202 and the standard viewpoint image memory 204 (see step S402). This process will be explained in detail later with reference to FIG. 16.

Then in the global parallax compensation data determination unit 206, global parallax data for the standard viewpoint image, which satisfies the Epipolar geometry constraint, is computed using the local parallax data, and the global parallax data is encoded (see step S403). This process will be explained in detail later with reference to FIG. 17.

The following process (in steps S405 to S408) is performed for each image in the image memory 202. In the following explanation, the image of camera B is first encoded before the image of camera C is encoded.

That is, the image of camera B is read from the image memory 202 and is set as the target image for encoding (see step S404), and the global parallax data computed in step S403 is converted by the base parallax data determination unit 207 into base parallax data (for the target image) based on the Epipolar geometry constraint (see step S405). Based on the local parallax data and the base parallax data, the reference viewpoint index, the correction parallax data, and the correction vector, which are the parallax compensation data, are computed and encoded by the parallax compensation data determination unit 208 in consideration of the encoding efficiency (see step S406). The target image is then encoded by the image encoding unit 209 by using the computed parallax compensation data (see step S407). The encoded image is then decoded, and is stored in the decoded image memory 210 (see step S408).

If the encoded image belongs to camera B (see step S409), the image of camera C is read from the image memory 202 (see step S410), and is encoded through a similar process (steps S405 to S408), so that the entire operation is completed.

As the process in step S405 is similar to that performed in the above-described step S4 (see FIG. 6), explanations thereof are omitted.

In addition, the process in step S406 will be explained in detail with reference to FIG. 18.

Figure 16:
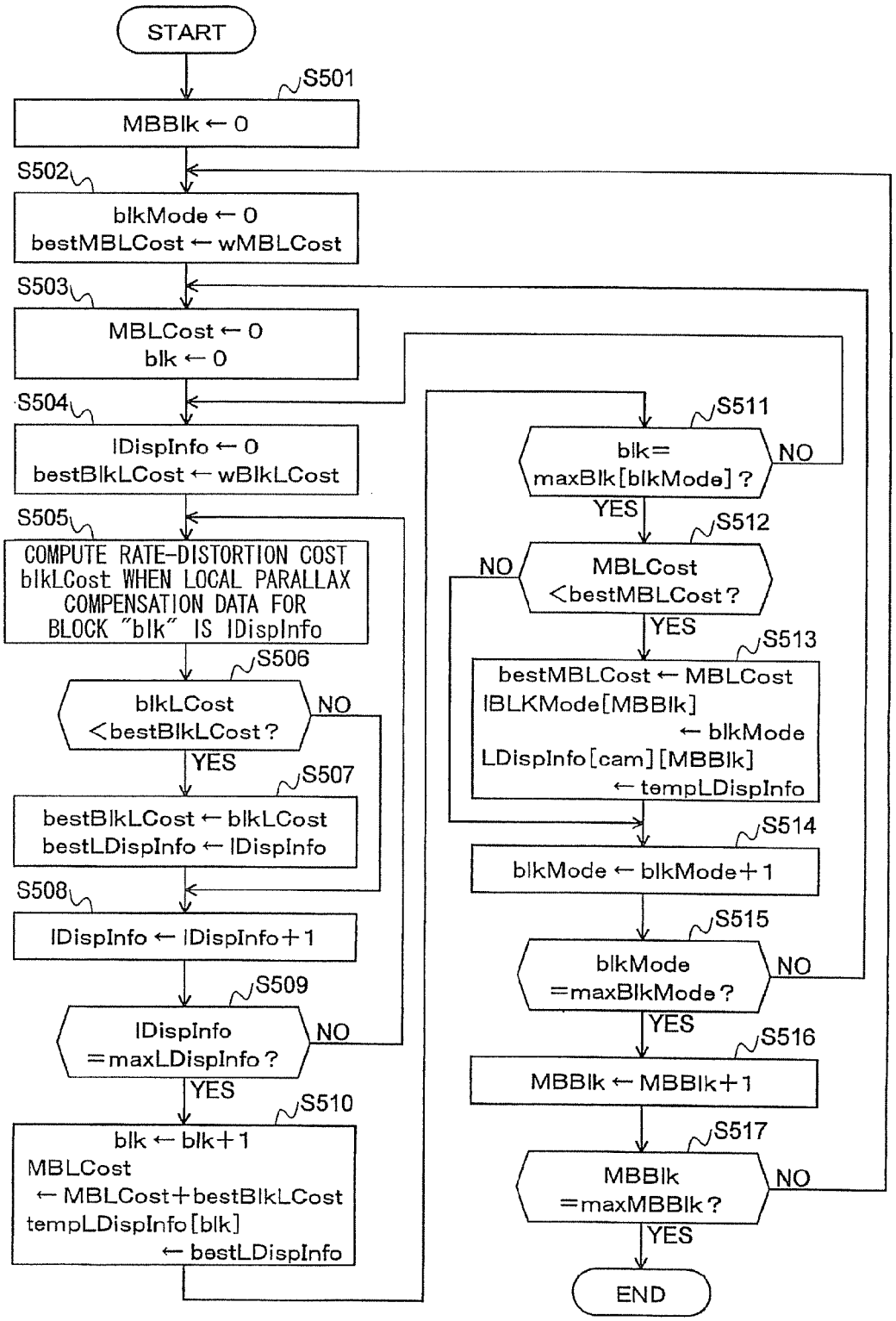
FIG. 16 is a detailed flowchart of step S402 in FIG. 15.

FIG. 16 shows a detailed operation flow of step S402 performed by the local parallax compensation data determination unit 205 which applies the relevant operation to each image stored in the image memory 202.

In the second embodiment, a block division is set for each macroblock formed by 16×16 pixels, and blocks are produced in each macroblock by the block division. The local parallax data is determined and encoded for each divided block. There are many block division forms applicable to the macroblock, and FIG. 8 shows some examples thereof.

Similar to the first embodiment, "blkMode" is an index showing the type of the block division, and "maxBlk[blk-Mode]" represents the number of blocks for block division "blkMode". Additionally, "maxBlkMode" represents the number of types of block division.

In addition, "MBBlk" is an index of each macroblock, and "maxMBBlk" indicates the number of macroblocks.

In the relevant operation, after the index MBBlk of the macroblock is initialized to zero (see step S501), the process (from step S502 to Step S515) for determining the block division and the local parallax data is repeatedly performed while MBBlk is incremented by one (see step S516), until MBBlk reaches the number "maxMBBlk" of macroblocks in the relevant image (see step S517).

In the process of determining the block division and the local parallax data, local parallax compensation data which is most suitable for each block division is determined, and a block division which is most highly estimated is selected.

Specifically, after block division blkMode is initialized to zero and the best estimated value "bestMBLCost" for the macroblock is initialized to the maximum estimated value "wMBLCost" which can never be obtained (see step S502), the following process is repeatedly performed while blkMode is incremented by one (see step S514), until blkMode reaches maxBlkMode (see step S515). In the repeated process, an estimated value "MBLCost" for block division blkMode is computed (see steps S503 to S511), and if MBLCost is smaller than bestMBLCpst (see step S512), MBLCost is stored as "bestMBLCost", the corresponding block division blkMode is stored in lBLKMode[MBBlk], and the corresponding local parallax compensation data tempLDispInfo (for each block) is stored in LDispInfo[cam] (see step S513).

The above "cam" is an index assigned to each image in the image memory 202.

In the process of computing the estimated value for each block division, optimum local parallax compensation data is computed for each block, and the total sum thereof is used as the estimated value for the relevant block division.

Specifically, after the block index "blk" is initialized to zero and the estimated value MBLCost for the block division is also initialized to zero (see step S503), the following process is repeatedly performed while "blk" is incremented by 1 (see step S510), until "blk" reaches maxBlk[blkMode] (see step S511). In the repeated process, the best local parallax compensation data bestLDispInfo and the best estimated value bestBlkLCost for block "blk" are computed (see steps S504 to S509), bestBlkLCost is added to MBLCost, and bestLDispInfo is stored in tempLDispInfo[blk] (see step S510).

Here, if a block is predicted using another image, the above-described best local parallax compensation data for the block is a set of data which indicates the image used for the prediction and the local parallax data based on the Epipolar geometry constraint, by which the rate-distortion cost is minimized.

Therefore, the rate-distortion cost functions as the estimated value for the local parallax compensation data, and the process of computing the best local parallax compensation data and the best estimated value for a target block corresponds to the process of computing a set of the reference viewpoint index and the local parallax data, by which the rate-distortion cost is minimized.

That is, after local parallax compensation data index "lDispInfo" corresponding to the set of the viewpoint index and the local parallax data is initialized to zero, and the best rate-distortion cost "bestBlkLCost" is initialized to the maximum value "wBlkCost" which can never be obtained (see step S504), the following process is repeatedly performed while lDispInfo is incremented by 1 (see step S508), until lDispInfo reaches "maxLDispInfo" which is the number of combinations between the viewpoint index and the local parallax data (see step S509). In the repeated process, the rate-distortion cost "blkLCost" for lDispInfo is computed (see step S505), and if blkLCost is smaller than bestBlkLCost (see step S506), then blkLCost is stored as bestBlkLCost, and lDispInfo is stored as bestLDispInfo (see step S507).

The rate-distortion cost blkLCost for lDispInfo can be computed by the following formula.

$$blkLCost = D_3 + \lambda_3 \cdot Code(lDispInfo) \quad \text{[Formula 5]}$$

$$D_3 = \sum_{Tp \in \{pixels\ in\ block\}} |Value(cam, Tp) - Value(reference, Rp)|$$

$$Rp = Trans(cam, reference, Tp, dist_{cam}(lDispInfo))$$

$$ref = refer(lDispInfo)$$

In the above formula, $\lambda_3$ is an undefined Lagrange multiplier, and is a predetermined value. In addition, "$dist_{cam}(\ )$" and "refer( )" are functions which have the same argument (local parallax compensation data) and respectively return the distance from the viewpoint "cam" to the imaged object and the reference viewpoint.

In the actual encoding, only already-encoded images can be referred to. Therefore, in the second embodiment, when "cam" is camera B, only the standard viewpoint can be a candidate of the reference viewpoint, and when "cam" is camera C, the standard viewpoint and the viewpoint of camera B can be candidates of the reference viewpoint.

Figure 17:
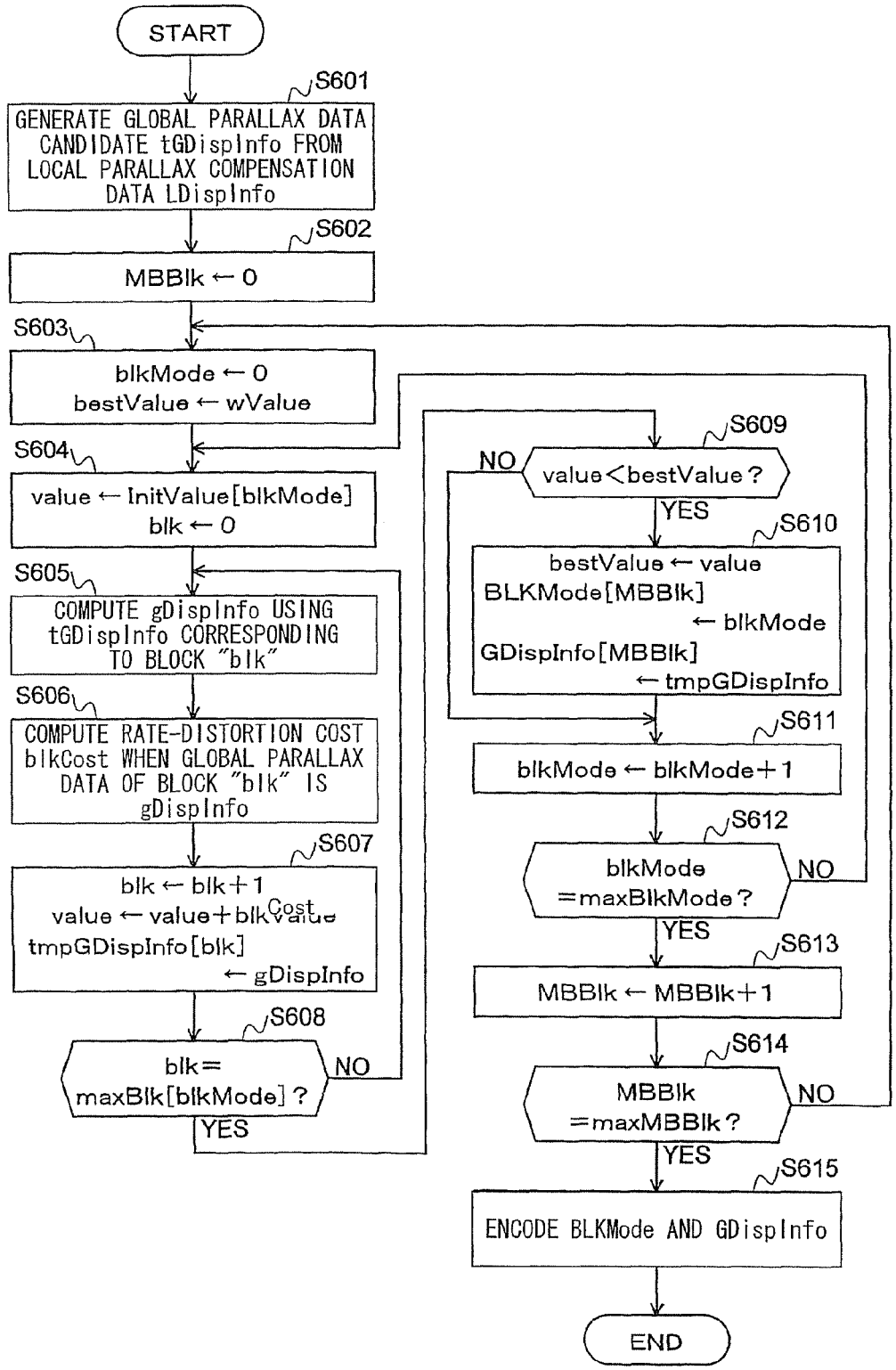
FIG. 17 is a detailed flowchart of step S403 in FIG. 15.

FIG. 17 shows a detailed operation flow of the process in step S403 performed in the global parallax compensation data determination unit 206. Similar to the first embodiment, in the second embodiment, a block division is designated for each macroblock, and global parallax data is computed for each block generated by the block division.

First, global parallax data candidate tGDispInfo is generated using the local parallax data based on the Epipolar geometry constraint, where the local parallax data is an element of the local parallax compensation data LDispInfo determined by the local parallax compensation data determination unit 205 (see step S601).

This process is executed by using the process (see FIG. 9) of computing the base parallax data, where the local parallax data is regarded as the global parallax data, the viewpoint to which the local parallax data is provided is regarded as the standard viewpoint, and the standard viewpoint is regarded as the target viewpoint for encoding. In such a case, the result corresponding to the base parallax data functions as the global parallax data candidate. The above process is performed for each image in the image memory 202, and the global parallax data candidate for each image is represented by "tGDispInfo[cam]", where "cam" is the image index.

In the second embodiment, the above-computed tGDispInfo is used for determining block division data for each macroblock, and global parallax data is determined for each block.

Therefore, after the macroblock index MBBlk is initialized to zero (see step S602), the process (steps S603 to S612) for computing the best block division and the corresponding global parallax data among all possible block divisions is repeatedly performed while MBBlk is incremented by 1 (see step S613), until MBBlk reaches the number "maxMBBlk" of macroblocks (see step S614).

After that, the computed block division data BLKMode and the global parallax data GDispInfo are respectively encoded by the block division data encoding unit 2062 and the global parallax data encoding unit 2064 (see step S615).

In the process of computing the best block division and the corresponding global parallax data among all possible block divisions, the block division of each block division candidate is estimated, and the candidate having the highest estimated value is selected as the best block division.

Therefore, after the block division blkMode is initialized to zero and the best estimated value "bestValue" for the macroblock is initialized to "wValue" corresponding to the worst estimated value which can never be obtained (see step S603), the following process is repeatedly performed while blkMode is incremented by one (see step S611), until blkMode reaches maxBlkMode (see step S612). In the repeated process, an estimated value called "value" for block division blkMode is computed (see steps S604 to S608), and if "value" is smaller than "bestValue" (see step S609), then "value" and "bklk-Mode" are respectively stored as "bestValue" and "BLK-Mode[MBBlk]", and the presently-computed global parallax data tempGDispInfo is stored in GDispInfo[MBBlk] (see step S610).

The estimated value called "value" for the block division blkMode is obtained by computing the total sum of the rate-distortion costs for the parallax compensation applied to each divided block.

Therefore, after the block index "blk" is initialized to zero and "value" is initialized to an estimated value "InitValue[blkMode]" corresponding to the block division blkMode (see step S604), the following process is repeatedly performed while step S607 is performed, until "blk" reaches maxBlk[blkMode] (see step S608). In step S607, 1 is added to "blk", the rate-distortion cost "blkCost" for block "blk" is added to "value", and the presently-computed global parallax data gDispInfo is stored in tempGDispInfo[blk]. In the repeated process, gDispInfo is computed using tGDispInfo for block "blk" (see step S605), and the corresponding blk-Cost is computed (see step S606).

Additionally, InitValue[blkMode] is a predetermined value depending on the amount of code necessary for encoding the data which indicates that the block division is blkMode.

In the process of computing gDispInfo from tGDispInfo for block "blk", an average of tGDispInfo in block "blk" is computed and determined as gDispInfo. Instead of the average, a value which appears most frequently may be used.

A method of computing rate-distortion costs of both candidates so as to select the better one, or a method of computing a rate-distortion cost for each peripheral candidate value so as to select the best one, may be employed, where each method can be easily implemented as a variation of the present embodiment, and explanations thereof are omitted.

The rate-distortion cost blkCost when the global parallax data for block "blk" is gDispInfo can be computed by a formula similar to that used in step S105 (see FIG. 7) in the first embodiment. In addition, in order to reduce the amount of computation, the estimation may be performed using the following formula.

$$blkCost = \sum_{q \in \{pixels\ in\ block\ "blk"\}} |tGDispInfo[q] - gDispInfo| + \quad [\text{Formula 6}]$$

$$\lambda'_1 \cdot Rate(gDispInfo)$$

Figure 18:
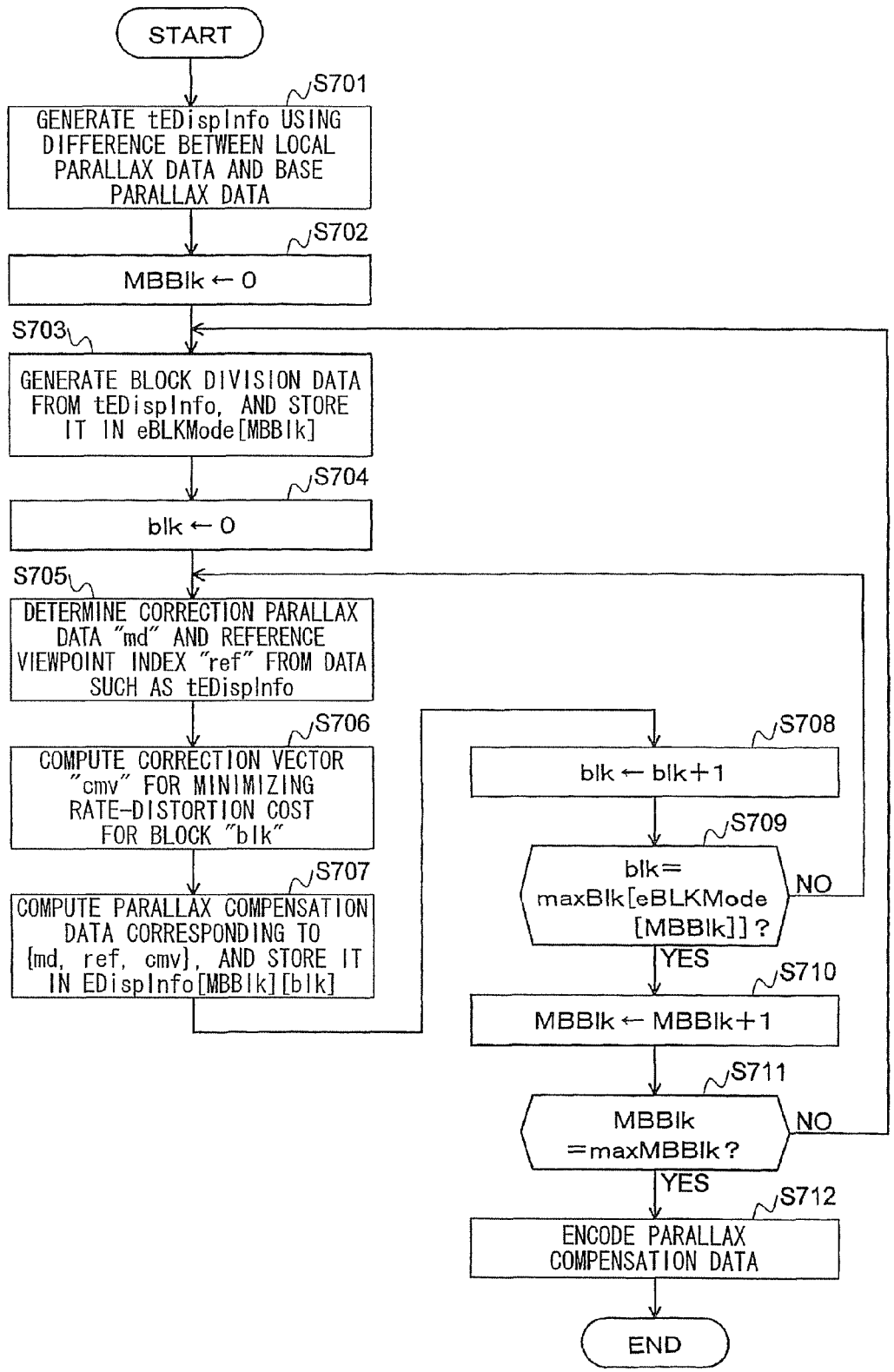
FIG. 18 is a detailed flowchart of step S406 in FIG. 15.

FIG. 18 shows a detailed operation flow of step S406 performed in the parallax compensation data determination unit 208.

Similar to in the first embodiment, in the second embodiment, a block division is selected for each macroblock, and parallax compensation data, which consists of the reference viewpoint index, the correction parallax data, and the correction vector, is computed and encoded for each block.

The distinctive feature in comparison with the first embodiment is to compute the correction vector after the block division, the reference viewpoint index, and the correction parallax data are determined using the local parallax data which is communicated from the local parallax data determination unit 2053 in the local parallax compensation data determination unit 205.

That is, first, a correction parallax data candidate tEDispInfo is generated by computing the difference between the local parallax data and the base parallax data (see step S701).

Then, after the macroblock index MBBlk is initialized to zero (see step S702), the following process is repeatedly performed while MBBlk is incremented by 1 (see step S710), until MBBlk reaches the number maxMBBlk of macroblocks included in the relevant image (see step S711). In the repeated process, block division eBLKMode[MBBlk] is determined (see step S703), and the parallax compensation data EDispInfo is computed (see step S709).

After that, the block division data eBLKMode and the parallax compensation data EDispInfo are encoded (see step S712).

In the process of step S703, the block division is determined to be the one which produces the minimum number of divided blocks, among block division forms, each of which satisfies the condition that all pixels included in each block have the same value of tEDispInfo.

If there are a plurality of block divisions which satisfy the above condition, a block division having the largest maximum block is selected. If one block division cannot be determined by this condition, any block division which satisfies the condition is selected.

Additionally, if no block division satisfies the primary condition, a block division having the greatest number of blocks and the smallest minimum block size is selected.

In the process of computing the parallax compensation data, the best parallax compensation data is computed for each block in accordance with the block division eBLKMode[MBBlk] determined for the relevant macroblock.

That is, after the block index "blk" is initialized to zero (see step S704), the following process is repeatedly performed while "blk" is incremented by 1 (see step S708), until "blk" reaches the number "maxBlk[eBLKMode[MBBlk]]" of blocks (see step S709). In the repeated process, (i) the correction parallax data "md" is computed using tEDispInfo, and the reference viewpoint index "ref" is computed using the first viewpoint index communicated from the reference viewpoint index setting unit 2052 in the local parallax compensation data determination unit 205 (see step S705), (ii) a correction vector "cmv" for minimizing the rate-distortion cost of the block "blk" is computed using the values computed in step S705 (see step S706), and (iii) parallax compensation data corresponding to the set {md, ref, cmv} is computed and is stored in EDispInfo[MBBlk][blk] (see step S707).

In addition, the rate-distortion cost for the block, which is used in the process of step S706, can be computed by a formula similar to that used for computing a cost in step S306 (see FIG. 10) of the first embodiment.

In the process of step S705, the correction parallax data is determined as a value of tEDispInfo (assigned to each pixel in the relevant block) which appears most frequently. In addition, the reference viewpoint index is determined as the first viewpoint index corresponding to a pixel (in the relevant block) for which the determined correction parallax data coincides with tEDispInfo. Although a value of tEDispInfo, which appears most frequently, is selected in the above case, an average in the block may be used.

In the parallax compensation data determination unit 208 of the second embodiment, the block division, the correction parallax data, and the reference viewpoint index are determined by using the data communicated from the local parallax compensation data determination unit 205, without considering the rate-distortion cost. However, similar to the parallax compensation data determination unit 107 in the first embodiment, they may be determined in consideration of the rate-distortion cost.

Additionally, not similar to the first embodiment, only part of the block division, the correction parallax data, and the reference viewpoint index may be determined in consideration of the rate-distortion cost. Such a case can be easily implemented as a variation produced by partially combining the first embodiment and the second embodiment, and thus explanations thereof are omitted.

In the first and second embodiments, the block division form is determined in the standard viewpoint image block division setting unit 1051 or 2061 in the global parallax compensation data determination unit 105 or 206, and the block division data as the result thereof is encoded in the block division data encoding unit 1052 or 2062.

However, the block division data may not be encoded if the block division set in the standard viewpoint image block division setting unit 1051 or 2061 coincides with a block division employed when the standard viewpoint image was encoded for each block.

In such a case, the amount of code can be reduced by an amount necessary for indicating the block division data.

Also in the first and second embodiments, a target image for encoding is subjected to parallax compensation by using an already-encoded image of another viewpoint, and is encoded. However, for the encoding of each block in the target image, one having a higher prediction efficiency may be selected between parallax compensation and motion compensation. In such a case, the parallax compensation data for each block to which no parallax compensation is applied can be set to a value which produces the minimum amount of code, where this method can be easily implemented as a variation of the present embodiments, and explanations thereof are omitted.

In addition, it is unnecessary for the types of the block division selected by the relevant units in the encoding apparatus to be the same. In particular, if the block division on the standard viewpoint image used for computing the global parallax data has a larger block size in comparison with the other block divisions, the amount of code of the global parallax data can be reduced, and general parallax data which is not affected by an error of camera parameters or the like can be represented.

Figure 19:
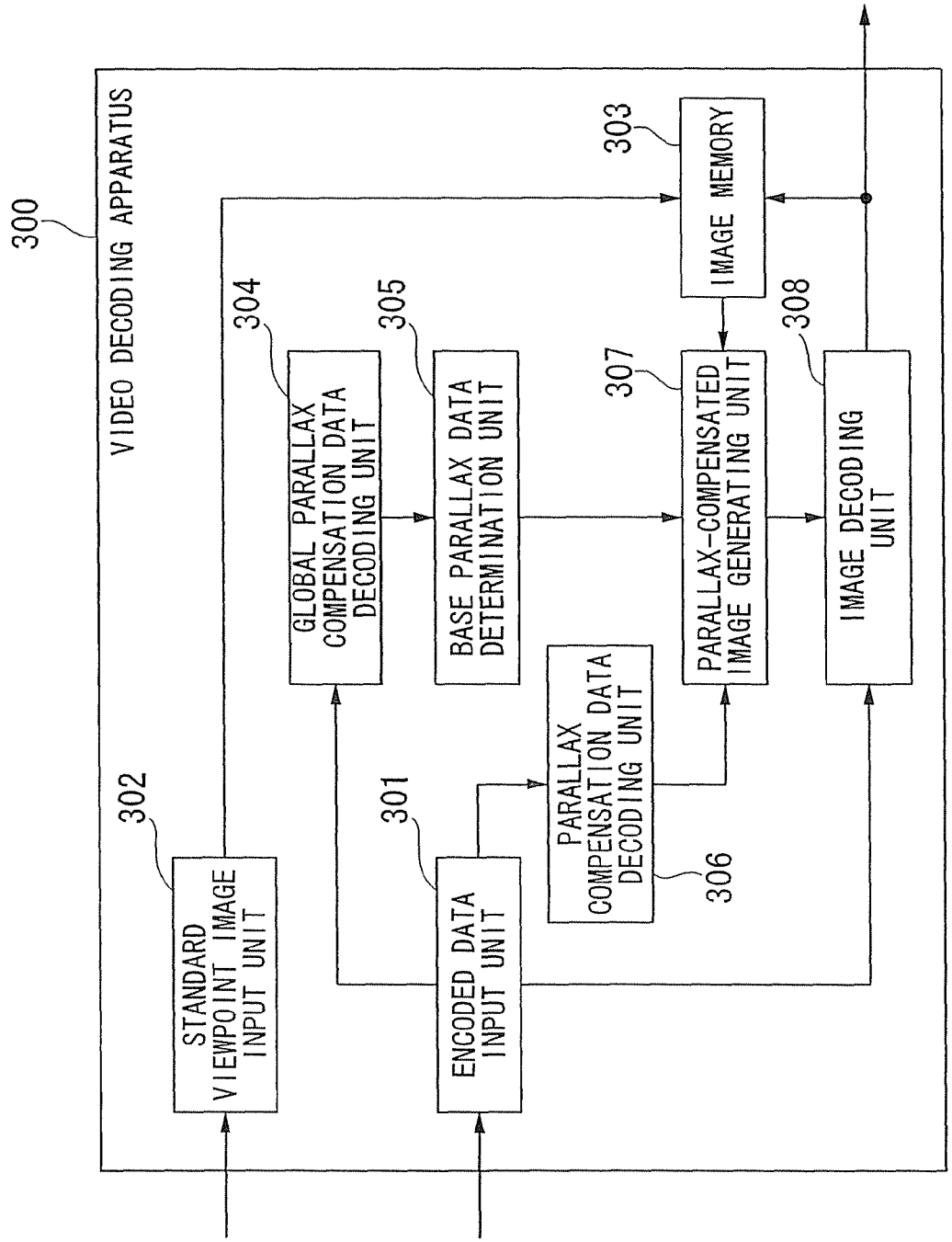
FIG. 19 is a diagram showing a video decoding apparatus as a third embodiment of the present invention.

FIG. 19 shows a video decoding apparatus 300 as a third embodiment of the present invention.

The video decoding apparatus 300 has an encoded data input unit 301 into which encoded data is input; a standard viewpoint image input unit 302 into which a decoded image of camera A as the standard viewpoint is input; an image memory 303 for storing images (including the image of the standard viewpoint) which can be referred to in parallax compensation; a global parallax compensation data decoding unit 304 for decoding (from the input encoded data) the block division data for the standard viewpoint and the global parallax data based on the Epipolar geometry constraint; a base parallax data determination unit 305 for determining base parallax data which is produced using the global parallax data and is parallax data (for the viewpoint of each target image for decoding) based on the Epipolar geometry constraint; a parallax compensation data decoding unit 306 for decoding (the input encoded data) the block division data for the target image for decoding, the reference viewpoint index which indicates a reference image used in parallax compensation, correction parallax data for correcting the parallax data in accordance with the Epipolar geometry constraint, and the correction vector for correcting the corresponding point used in parallax compensation; a parallax-compensated image generating unit 307 for generating a parallax-compensated image for the viewpoint of the target image, based on the decoded data; and an image decoding unit 308 for decoding the target image using the input encoded data and the generated parallax-compensated image.

When decoding the target image by referring to an already-decoded image, the image decoding part 308 may include a memory for storing decoded images. Such a memory may also function as the image memory 303.

Figure 20:
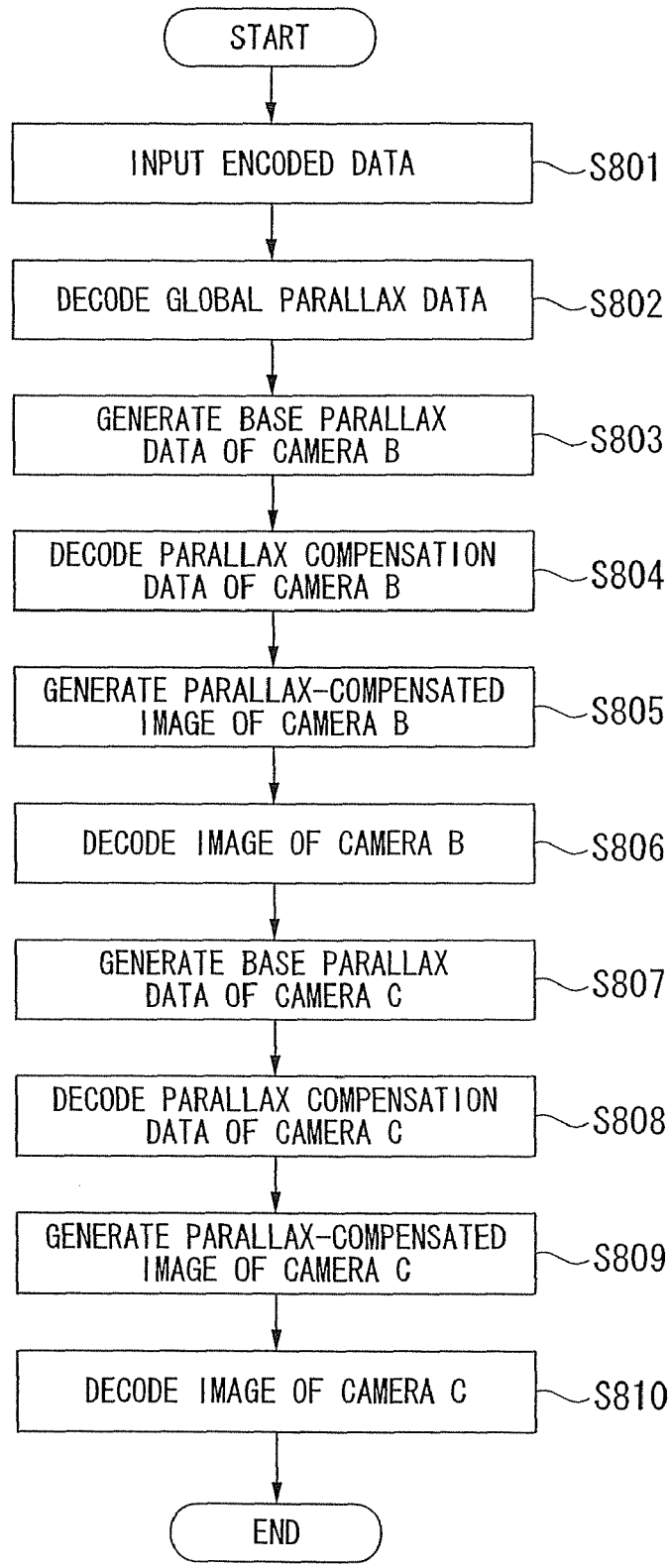
FIG. 20 is a flowchart of image decoding in the third embodiment.
Figure 21:
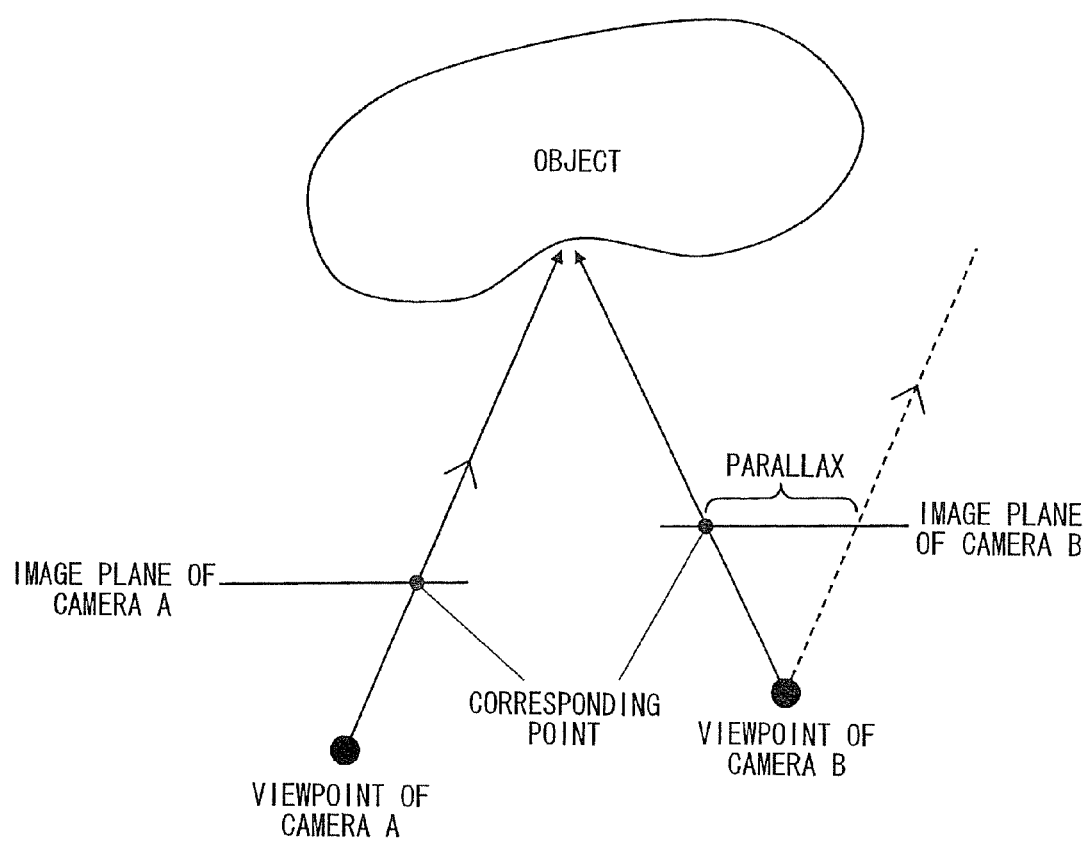
FIG. 21 is a schematic view showing the concept of parallax generated between cameras.

FIG. 20 shows an operation flow of the decoding process in the present embodiment. In this flow, the frames obtained by cameras B and C at the same time are sequentially decoded. Below, the flow will be explained in detail.

In addition, the frame of camera A, which was obtained at the same time as that of the decoded frames has been decoded, and camera parameters of each camera have been obtained.

First, encoded data is input into the encoded data input unit 301 (see step S801). In addition, a frame of camera A, which was obtained at the same time as that of frames included in the input encoded data, was input into the standard viewpoint image input unit 302, and has been stored in the image memory 303. The input encoded data is the entire encoded data of one frame, which was output from a video encoding apparatus as shown in the first or second embodiment.

Next, in the global parallax compensation data decoding unit 304, the block division data for the standard viewpoint image is decoded from the input encoded data, and in accordance with the relevant block division, the global parallax data for each block is decoded, so as to obtain global parallax data decGDispInfo for each pixel of the standard viewpoint image (see step S802).

Next, in the base parallax data determination unit 305, base parallax data decBDispInfo for the viewpoint of camera B is computed using decGDispInfo (see step S803).

This process is implemented by the operation flow which was explained with reference to FIG. 9. However, BDispInfo, GDispInfo, and the target image for encoding in FIG. 9 are respectively regarded as decBDispInfo, decGDispInfo, and the target image for decoding.

After obtaining the base parallax data, in the parallax compensation data decoding unit 306, the block division data for camera B is decoded from the input encoded data, and in accordance with the relevant block division, the reference viewpoint index, the correction parallax data, and the correction vector are decoded, so as to obtain the reference viewpoint index "decRef", the correction parallax data "decMd", and the correction vector "decCmv" for each pixel for camera B (see step S804).

Then in the parallax-compensated image generating unit 307, a parallax-compensated image DCImage for camera B is generated by referring to the relevant image in the image memory 303, by using the following formulas (see step S805).

$$DCImage[PIX] = \text{Value}(dec\text{Ref}[PIX], RP)$$

$$RP = \text{Trans}(camB, dec\text{Ref}[PIX], PIX, d_{camB}(decB\text{-}DispInfo[PIX] + decMd[PIX])) + decCmv[PIX]$$

where "camB" indicates the viewpoint of camera B, and PIX indicates the pixel position on the target image for decoding.

In the image decoding unit 308, the image B of camera B is decoded from the input encoded data, by using the parallax-compensated image (see step S806). The decoded image is stored in the image memory 303.

After that, a process similar to steps S803 to S806 is applied to camera C, so as to decode the image of camera C (see steps S807 to S810).

The above-described video encoding and decoding processes can be implemented, not only by a hardware or firmware resource, but also by a computer and a software program. Such a program may be provided by storing it in a computer-readable storage medium, or by means of a network.

While embodiments of the present invention have been described with reference to the drawings, it should be understood that these are exemplary embodiments of the invention and are not to be considered as limiting. Additions, omissions, or substitutions of structural elements, and other modifications for the above-described embodiments can be made without departing from the concept and scope of the present invention.

INDUSTRIAL APPLICABILITY

In accordance with the present invention, highly efficient encoding of the whole multi-viewpoint images or multi-viewpoint video images can be performed by implementing parallax compensation having a high prediction accuracy in consideration of an influence of estimation errors of camera parameters, while preventing a great increase in the amount of data used for the parallax compensation.

The invention claimed is:

1. An image encoding method of determining a standard viewpoint, and encoding an image of a viewpoint other than the standard viewpoint by using an already-encoded image of the standard viewpoint, so as to encode multi-viewpoint images, the method comprising:
   a global parallax data determination step of estimating and determining global parallax data which provides parallax between a reference standard viewpoint image, which is the already-encoded image of the standard viewpoint, and all images of viewpoints other than the standard viewpoint, based on the Epipolar geometry constraint;
   a global parallax data encoding step of encoding the determined global parallax data;
   a base parallax data determination step of converting the determined global parallax data into base parallax data which provides parallax between each target viewpoint image for encoding, which has a viewpoint other than the standard viewpoint, and all the other viewpoints, based on the Epipolar geometry constraint;
   a correction parallax data determination step of determining correction parallax data defined as the difference between the base parallax data and parallax data which provides parallax between the target viewpoint image and an already-encoded reference viewpoint image used in parallax compensation performed when encoding the target viewpoint image;
   a correction parallax data encoding step of encoding the correction parallax data; and
   a viewpoint image encoding step of encoding the target viewpoint image while performing the parallax compensation from the reference viewpoint image by using corresponding point data provided by the base parallax data and the correction parallax data.

2. An image encoding method of determining a standard viewpoint, and encoding an image of a viewpoint other than the standard viewpoint by using an already-encoded image of the standard viewpoint, so as to encode multi-viewpoint images, the method comprising:
   a global parallax data determination step of estimating and determining global parallax data which provides parallax between a reference standard viewpoint image, which is the already-encoded image of the standard viewpoint, and all images of viewpoints other than the standard viewpoint, based on the Epipolar geometry constraint;
   a global parallax data encoding step of encoding the determined global parallax data;
   a base parallax data determination step of converting the determined global parallax data into base parallax data which provides parallax between each target viewpoint image for encoding, which has a viewpoint other than the standard viewpoint, and all the other viewpoints, based on the Epipolar geometry constraint;
   a correction parallax vector determination step of determining a correction parallax vector defined as the difference between a parallax vector provided by the base parallax data and a parallax vector which provides corresponding points between the target viewpoint image and an already-encoded reference viewpoint image used in parallax compensation performed when encoding the target viewpoint image;
   a correction parallax vector encoding step of encoding the correction parallax vector; and
   a viewpoint image encoding step of encoding the target viewpoint image while performing the parallax compensation from the reference viewpoint image by using the base parallax data and the correction parallax vector.

3. The image encoding method in accordance with claim 1, further comprising:
   a correction vector determination step of determining a correction vector which indicates a displacement from a parallax compensation vector used in the parallax compensation to a corresponding point vector which is determined between the target viewpoint image and the reference viewpoint image, where the corresponding point vector is indicated by parallax data represented by using the base parallax data determined in the base parallax data determination step and the correction parallax data determined in the correction parallax data determination step; and
   a correction vector encoding step of encoding the correction vector,
   wherein in the viewpoint image encoding step, the parallax compensation is performed using the parallax compensation vector corrected by the correction vector.

4. The image encoding method in accordance with any one of claims 1 and 2, further comprising:
- a standard viewpoint area division setting step of setting an area division on the reference standard viewpoint image,
- wherein in the global parallax data determination step, the global parallax data is estimated and determined for each area determined in the standard viewpoint area division setting step.

5. The image encoding method in accordance with claim 4, wherein if the entire reference standard viewpoint image was subjected to an area division and each divided area was encoded, then in the standard viewpoint area division setting step, a similar area division is set in accordance with area division data included in the encoded data of the reference standard viewpoint image.

6. The image encoding method in accordance with claim 4, further comprising:
- a standard viewpoint area division encoding step of encoding area division data which indicates the area division set in the standard viewpoint area division setting step.

7. The image encoding method in accordance with claim 6, wherein if the entire reference standard viewpoint image was subjected to an area division and each divided area was encoded, then in the standard viewpoint area division encoding step, only data which indicate a difference from area division data included in the encoded data of the reference standard viewpoint image is encoded.

8. The image encoding method in accordance with any one of claims 1 and 2, further comprising:
- a target viewpoint area division setting step of setting an area division on the target viewpoint image for encoding,
- wherein in the viewpoint image encoding step, the target viewpoint image is encoded while changing a target, which is referred to in the parallax compensation, for each area determined in the target viewpoint area division setting step.

9. The image encoding method in accordance with claim 8, wherein if in the viewpoint image encoding step, the entire target viewpoint image is subjected to an area division and each divided area is encoded together with area division data which indicates the area division, then the encoding in the viewpoint image encoding step is performed using the area division set in the target viewpoint area division setting step.

10. The image encoding method in accordance with claim 8, further comprising:
- a target viewpoint area division encoding step of encoding area division data which indicates the area division set in the target viewpoint area division setting step.

11. The image encoding method in accordance with claim 10, wherein if in the viewpoint image encoding step, the entire target viewpoint image has been subjected to an area division and each divided area has been encoded together with area division data which indicates the area division, then in the target viewpoint area division encoding step, only data which indicates a difference from the area division used in the viewpoint image encoding step is encoded.

12. The image encoding method in accordance with any one of claims 1 and 2, further comprising:
- a reference viewpoint determination step of setting a reference viewpoint as the viewpoint of the reference viewpoint image; and
- a step of encoding a viewpoint index which indicates the reference viewpoint,
- wherein in the viewpoint image encoding step, an already-encoded image of the reference viewpoint is used as the reference viewpoint image.

13. The image encoding method in accordance with claim 8, further comprising:
- a reference viewpoint determination step of setting a reference viewpoint as the viewpoint of the reference viewpoint image, for each divided area determined in the target viewpoint area division setting step; and
- a step of encoding a viewpoint index which indicates the reference viewpoint,
- wherein in the viewpoint image encoding step, for each divided area determined in the target viewpoint area division setting step, an already-encoded image of the reference viewpoint is used as the reference viewpoint image.

14. The image encoding method in accordance with any one of claims 1 and 2, further comprising:
- an area division setting step of setting an area division on the target viewpoint image for encoding;
- a step of determining local parallax data for each divided area determined in the area division setting step, where the local parallax data provides a corresponding point used for subjecting the target image for encoding to parallax compensation based on the Epipolar geometry constraint; and
- a global parallax data candidate setting step of setting global parallax data candidates so as to convert the local parallax data to the global parallax data,
- wherein in the global parallax data candidate setting step, for each area, an average of the global parallax data candidates or a value among the global parallax data candidates which appears most frequently is determined as the global parallax data.

15. An image decoding method of decoding an image of a viewpoint other than an already-determined standard viewpoint by using a reference standard viewpoint image which is an already-decoded image of the standard viewpoint, so as to decode encoded data of multi-viewpoint images, the method comprising:
- a global parallax data decoding step of decoding, from the encoded data, global parallax data which provides parallax between the reference standard viewpoint image and all images of viewpoints other than the standard viewpoint, based on the Epipolar geometry constraint;
- a base parallax data determination step of converting the decoded global parallax data into base parallax data which provides parallax between each target viewpoint image for decoding, which has a viewpoint other than the standard viewpoint, and all the other viewpoints, based on the Epipolar geometry constraint;
- a correction parallax data decoding step of decoding, from the encoded data, correction parallax data defined as the difference between the base parallax data and parallax data which provides parallax between the target viewpoint image and an already-decoded reference viewpoint image used in parallax compensation performed when decoding the target viewpoint image; and
- a viewpoint image decoding step of decoding the target viewpoint image from the encoded data while performing the parallax compensation from the reference viewpoint image by using corresponding point data provided by the base parallax data and the correction parallax data.

16. An image decoding method of decoding an image of a viewpoint other than an already-determined standard viewpoint by using a reference standard viewpoint image which is an already-decoded image of the standard viewpoint, so as to decode encoded data of multi-viewpoint images, the method comprising:

a global parallax data decoding step of decoding, from the encoded data, global parallax data which provides parallax between the reference standard viewpoint image and all images of viewpoints other than the standard viewpoint, based on the Epipolar geometry constraint;

a base parallax data determination step of converting the decoded global parallax data into base parallax data which provides parallax between each target viewpoint image for decoding, which has a viewpoint other than the standard viewpoint, and all the other viewpoints, based on the Epipolar geometry constraint;

a correction parallax vector decoding step of decoding, from the encoded data, a correction parallax vector defined as the difference between a parallax vector provided by the base parallax data and a parallax vector which provides corresponding points between the target viewpoint image and an already-decoded reference viewpoint image used in parallax compensation performed when decoding the target viewpoint image; and a viewpoint image decoding step of decoding the target viewpoint image from the encoded data while performing the parallax compensation from the reference viewpoint image by using corresponding point data provided by the base parallax data and the correction parallax vector.

17. The image decoding method in accordance with claim 15, further comprising:

a correction vector decoding step of decoding, from the encoded data, a correction vector which indicates a difference from a corresponding point vector which is determined between the target viewpoint image and the reference viewpoint image to a parallax compensation vector used in the parallax compensation, where the corresponding point vector is represented using the base parallax data determined in the base parallax data determination step and the correction parallax data decoded in the correction parallax data decoding step;

wherein in the viewpoint image decoding step, the parallax compensation is performed using the parallax compensation vector corrected by the correction vector.

18. The image decoding method in accordance with any one of claims 15 and 16, further comprising:

a standard viewpoint area division decoding step of decoding, from the encoded data, data which indicates an area division on the reference standard viewpoint image, wherein in the global parallax data decoding step, the global parallax data is decoded for each area of the area division obtained by the standard viewpoint area division decoding step.

19. The image decoding method in accordance with claim 18, wherein if the entire reference standard viewpoint image was subjected to an area division and each divided area was encoded, then in the standard viewpoint area division decoding step, the area division is set using data which is included in the encoded data of the reference standard viewpoint image and indicates an area division.

20. The image decoding method in accordance with claim 18, wherein if the entire reference standard viewpoint image was subjected to an area division and each divided area was encoded, then:

in the standard viewpoint area division decoding step, difference indication data is decoded, which indicates a difference from area division data which is included in the encoded data of the reference standard viewpoint image and indicates an area division; and the area division in the decoding of the global parallax data is set using the area division data and the difference indication data.

21. The image decoding method in accordance with any one of claims 15 and 16, further comprising:

a target viewpoint area division decoding step of decoding, from the encoded data, data which indicates an area division on the target viewpoint image for decoding, wherein in the viewpoint image decoding step, the target viewpoint image is decoded while changing a parallax compensation vector used in the parallax compensation, for each area of the area division indicated by the data decoded in the target viewpoint area division decoding step.

22. The image decoding method in accordance with claim 21, wherein if the entire target viewpoint image has been subjected to an area division and each divided area has been encoded together with data which indicates the area division, then in the target viewpoint area division decoding step, the area division is set using data which is included in the encoded data of the target viewpoint image and indicates an area division.

23. The image decoding method in accordance with claim 21, wherein if the entire target viewpoint image has been subjected to an area division and each divided area has been encoded together with area division data which indicates the area division, then in the target viewpoint area division decoding step, difference indication data, which relates to area division and indicates a difference from the area division data, is decoded from the encoded data, and the area division used for changing the parallax compensation vector is set using the area division data and the difference indication data.

24. The image decoding method in accordance with any one of claims 15 and 16, further comprising:

a viewpoint index decoding step for decoding, from the encoded data, a viewpoint index which indicates the viewpoint of the reference viewpoint image; and a step of determining the viewpoint, which is indicated by the viewpoint index, as a reference viewpoint, wherein in the viewpoint image decoding step, an already-decoded image of the reference viewpoint is used as the reference viewpoint image.

25. The image decoding method in accordance with claim 21, further comprising:

a viewpoint index decoding step for decoding, from the encoded data, a viewpoint index which indicates the viewpoint of the reference viewpoint image, for each divided area determined by the target viewpoint area division decoding step; and a step of determining the viewpoint, which is indicated by the viewpoint index, as a reference viewpoint for each divided area determined by the target viewpoint area division decoding step, wherein in the viewpoint image decoding step, for each divided area determined by the target viewpoint area division decoding step, an already-decoded image of the reference viewpoint is used as the reference viewpoint image.

26. An image encoding apparatus having devices for performing the steps in the image encoding method in accordance with any one of claims 1 and 2.

27. A non-transitory computer-readable storage medium which stores an image decoding program by which a computer executes the steps in the image decoding method in accordance with any one of claims 15 and 16.

28. A non-transitory computer-readable storage medium which stores an image encoding program by which a computer executes the steps in the image encoding method in accordance with any one of claims 1 and 2.

29. An image decoding apparatus having devices for performing the steps in the image decoding method in accordance with any one of claims 15 and 16.

* * * * *